United States Patent
Kuroda

(10) Patent No.: US 7,714,918 B2
(45) Date of Patent: *May 11, 2010

(54) SOLID-STATE IMAGING APPARATUS

(75) Inventor: Yukihiro Kuroda, Ebina (JP)

(73) Assignee: Olympus Corporation, Tokyo (JP)

( * ) Notice: Subject to any disclaimer, the term of this patent is extended or adjusted under 35 U.S.C. 154(b) by 565 days.

This patent is subject to a terminal disclaimer.

(21) Appl. No.: 11/633,636

(22) Filed: Dec. 5, 2006

(65) Prior Publication Data

US 2007/0126902 A1 Jun. 7, 2007

(30) Foreign Application Priority Data

Dec. 6, 2005 (JP) ............................. 2005-351460

(51) Int. Cl.
*H04N 5/335* (2006.01)

(52) U.S. Cl. ....................... 348/296; 348/294

(58) Field of Classification Search ................ 348/294, 348/296, 302–308, 230.1; 250/208.1–208.6; 257/215, 242

See application file for complete search history.

(56) References Cited

U.S. PATENT DOCUMENTS 6,798,451 B1 * 9/2004 Suzuki et al. ............... 348/294
6,999,120 B1 * 2/2006 Egawa et al. ............... 348/296
2005/0105836 A1 * 5/2005 Gomi et al. ................ 384/302

FOREIGN PATENT DOCUMENTS

JP 5-316431 11/1993
JP 9-163245 6/1997

* cited by examiner

*Primary Examiner*—Tuan Ho
*Assistant Examiner*—Don Nguyen
(74) *Attorney, Agent, or Firm*—Westerman, Hattori, Daniels & Adrian, LLP

(57) ABSTRACT

A solid-state imaging apparatus including: a pixel section having a plurality of two-dimensionally disposed pixel cells each for effecting photoelectric conversion of an incident light; an electronic shutter scanning circuit for outputting to the pixel section a second line select signal for selecting second lines of a subject which an operation setting corresponding to an exposure time is effected; and a scanning control section for controlling selection of the first lines through the line scanning circuit, controlling, including as subject of selection the first lines and lines to be omitted in a skipping read, selection of the second lines through the electronic shutter scanning circuit, and controlling timing at which the pixel cells belonging to the second lines are reset in accordance with the exposure time.

21 Claims, 14 Drawing Sheets

SOLID-STATE IMAGING APPARATUS

This application claims benefit of Japanese Patent Application No. 2005-351460 filed in Japan on Dec. 6, 2005, the contents of which are incorporated by this reference.

BACKGROUND OF THE INVENTION

The present invention relates to solid-state imaging apparatus, and more particularly relates to solid-state imaging apparatus having skipping read and electronic shutter functions.

Various techniques have been proposed concerning solid-state imaging apparatus having an electronic shutter function. Japanese Patent Application Laid-Open hei-5-316431, for example, discloses a solid-state imaging apparatus where an electronic shutter function is achieved by providing a vertical scanning circuit for scanning rows to be read of a pixel section, and an electronic shutter scanning circuit for determining the timing of exposure operation where light is caused to be incident on each pixel.

The construction of a solid-state imaging apparatus having a known electronic shutter function will now be described by way of a block diagram shown in FIG. 1. The shown solid-state imaging apparatus includes: a pixel section 11 having a plurality of pixel cells PIX11 to PIX44 disposed in a matrix (showing only the sixteen pixel cells PIX11 to PIX44 for ease of explanation); a vertical scanning circuit 12 for use in selecting rows to be read out of the pixel section 11; an electronic shutter scanning circuit 13 for use in determining start of exposure; a multiplexer 14 for providing to the pixel section 11 an output of one or the other of the vertical scanning circuit 12 and the electronic shutter scanning circuit 13; a noise suppressing circuit 15 for suppressing noise contained in the signals read out to vertical signal line V1 to V4 of each column; a horizontal scanning circuit 16 for extracting signals from the noise suppressing circuit 15 by selectively turning ON/OFF horizontal select switches M1 to M4; and an output amplifier 17 for amplifying the extracted signals.

Also referring to FIG. 1, symbols are respectively used to denote: read row select lines φV1 to φV4; electronic shutter row select lines φVE1 to φVE4; pixel reset pulse line of each row φRST1 to φRST4; pixel transfer pulse line of each row φTR1 to φTR4; vertical signal line of each column V1 to V4; column select lines φH1 to φH4; and a sensor output line OUT.

An operation of the solid-state imaging apparatus shown in FIG. 1 will now be described by way of a timing chart shown in FIG. 2. The timing chart of FIG. 2 is to show the waveforms of φV1, φV2, φV3, φV4 (read row select line), φVE1, φVE2, φVE3, φVE4 (electronic shutter row select line), φRST1, φRST2, φRST3, φRST4 (pixel reset pulse line of each row), and φTR1, φTR2, φTR3, φTR4 (pixel transfer pulse line of each row). Further PD11 and PD12 represent electric potentials of photodiodes (not shown) of the pixel cells PIX11 and PIX12 in FIG. 1, respectively.

When an electronic shutter row select line φVE1 is driven to "H" level by the electronic shutter scanning circuit 13 at a timing point $t_1$, the electronic shutter row select line φVE1 is brought into its selected state. The pixel reset pulse line φRST1 is then driven to "H" level by the multiplexer 14 to set pixel cell PIX11 to a predetermined voltage value. Subsequently, when pixel transfer pulse line φTR1 is driven to "H" level at time $t_2$, the photodiode of pixel cell PIX11 discharges an electric charge so that electric potential PD11 of the photodiode is reset. The pixel transfer pulse line φTR1 is then driven to "L" level at time $t_2'$. Next, read row select line φV1 is selected by the vertical scanning circuit 12 at time $t_4$, and after that, at time $t_5$, the pixel transfer pulse line φTR1 is driven to "H" level again by the multiplexer 14. The time period from time $t_2'$ to time $t_5$ until the transfer of the pixel signal of pixel cell PIX11 becomes an exposure time of the pixel cell PIX11. Since sequential scanning is effected of the electronic shutter scanning circuit 13 and the vertical scanning circuit 12, the time period from time $t_3'$ to time $t_6$ similarly becomes an exposure time of the pixel cell PIX12 as shown in FIG. 2.

An electronic shutter function is achieved in this manner by providing a vertical scanning circuit for scanning rows to be read of the pixel section and an electronic shutter scanning circuit for determining the timing of exposure operation where light is caused to be incident on each pixel.

Further, various techniques have been proposed concerning solid-state imaging apparatus that are capable of reading pixel signals at high rates. For example, Japanese Patent Application Laid-Open hei-9-163245 discloses a solid-state imaging apparatus having a scanning circuit capable of skipping scanning. By using a scanning circuit capable of skipping scanning as the vertical scanning circuit 12 and the electronic shutter scanning circuit 13 of the solid-state imaging apparatus shown in FIG. 1, it can be used in a mode where, for example, signals of all pixels are read out in taking a high-definition still image while signals are read out at high rate in a skipping manner in providing dynamic image outputs.

SUMMARY OF THE INVENTION

In a first aspect of the invention, there is provided a solid-state imaging apparatus including: a pixel section having a plurality of two-dimensionally disposed pixel cells each for effecting photoelectric conversion of an incident light, accumulating it as an electric charge, and converting it into an electrical signal; a plurality of lines each connected in common to a number of pixel cells arranged in a row direction of the pixel section; a line scanning circuit for outputting to the pixel section a first line select signal for selecting first lines which are a subject to be read the electrical signals; an electronic shutter scanning circuit for outputting to the pixel section a second line select signal for selecting second lines of a subject which an operation setting corresponding to an exposure time is effected; and a scanning control section for controlling selection of the first lines through the line scanning circuit, controlling, including as subject of selection the first lines and lines to be omitted in a skipping read, selection of the second lines through the electronic shutter scanning circuit, and controlling timing at which the pixel cells belonging to the second lines are reset in accordance with the exposure time.

The first and second embodiments correspond to an embodiment of the solid-state imaging apparatus according to the first aspect.

In a second aspect of the invention, the scanning control section in the solid-state imaging apparatus according to the first aspect sets timing for resetting the pixel cells belonging to the omitted lines to the same as the timing for resetting the pixel cells belonging to the first lines, which is a timing conforming to the exposure time.

The first and second embodiments correspond to an embodiment of the solid-state imaging apparatus according to the second aspect.

In a third aspect of the invention, the solid-state imaging apparatus according to the first aspect further includes a mode switching section for switching based on an input from an external section to set a first mode for consecutively setting the first lines or a second mode for setting the first lines while omitting a number of lines corresponding to the omitted lines. The scanning control section controls the line scanning circuit and the electronic shutter scanning circuit in accordance with a mode set by the mode switching section.

The first and second embodiments correspond to an embodiment of the solid-state imaging apparatus according to the third aspect.

In a fourth aspect of the invention, when the second mode is set, the scanning control section in the solid-state imaging apparatus according to the third aspect controls the electronic shutter scanning circuit to cause the second line select signal to be outputted simultaneously to a plurality of the omitted lines.

The first and second embodiments correspond to an embodiment of the solid-state imaging apparatus according to the fourth aspect.

In a fifth aspect of the invention, when the second mode is set, the scanning control section in the solid-state imaging apparatus according to the third aspect controls the electronic shutter scanning section to cause the second line select signal to be outputted simultaneously to one line of the first lines and to at least one line of the omitted lines.

The first and second embodiments correspond to an embodiment of the solid-state imaging apparatus according to the fifth aspect.

In a sixth aspect of the invention, the electronic shutter scanning circuit in the solid-state imaging apparatus according to the fourth aspect is composed of a plurality of units connected in cascade, each unit comprising a select signal outputting section for transmitting to a next unit a start signal inputted to a start unit corresponding to a line where scanning is to be started and for outputting it as the second line select signal, and further includes a skip circuit section for executing skipping of lines to which the second line select signal is to be outputted in accordance with the number of lines of the omitted lines, and a simultaneous setting section for setting the start signal simultaneously to the start unit and to a number of the units corresponding to the number of lines of the omitted lines. When the second mode is set, the scanning control section activates function of the skip circuit section and the simultaneous setting section at the same time of outputting the start signal.

The first embodiment corresponds to an embodiment of the solid-state imaging apparatus according to the sixth aspect.

In a seventh aspect of the invention, the electronic shutter scanning circuit in the solid-state imaging apparatus according to the fourth aspect is composed of a plurality of units connected in cascade, each unit comprising a select signal outputting section for transmitting to a next unit a start signal inputted to a start unit corresponding to a line where scanning is to be started and for outputting it as the second line select signal, and further includes a skip circuit section for executing skipping of lines to which the second line select signal is to be outputted in accordance with the number of lines of the omitted lines. When the second mode is set, the scanning control section activates function of the skip circuit section at the same time of consecutively outputting the start signal for a number of times corresponding to the number of lines of the omitted lines.

The second embodiment corresponds to an embodiment of the solid-state imaging apparatus according to the seventh aspect.

In an eighth aspect of the invention, the line scanning circuit in the solid-state imaging apparatus according to the third aspect is composed of a plurality of units connected in cascade, each unit comprising a first select signal outputting section for transmitting to a next unit a start signal inputted to a start unit corresponding to a line where scanning is to be started and for outputting it as the first line select signal, and further includes a first skip circuit section for executing skipping of lines to which the first line select signal is to be outputted in accordance with the number of lines of the omitted lines. The electronic shutter scanning circuit is composed of a plurality of units connected in cascade, each unit comprising a second select signal outputting section for transmitting to a next unit the start signal inputted to a start unit corresponding to a line where scanning is to be started and for outputting it as the second line select signal, and further includes a second skip circuit section for executing skipping of lines to which the second line select signal is to be outputted in accordance with the number of lines of the omitted lines. When the second mode is set, the scanning control section activates function of the first skip circuit section with setting the start signal to the start unit of the line scanning circuit, and at the same time activates function of the second skip circuit section with setting the start signal to the unit corresponding to the start unit and to a number of the units corresponding to the number of lines of the omitted lines of the electronic shutter scanning circuit.

The first and second embodiments correspond to an embodiment of the solid-state imaging apparatus according to the eighth aspect.

In a ninth aspect of the invention, of the solid-state imaging apparatus according to the eighth aspect, when the second mode is set, the scanning control section controls the electronic shutter scanning circuit to cause the second line select signal to be outputted simultaneously to a plurality of the omitted lines.

The first and second embodiments correspond to an embodiment of the solid-state imaging apparatus according to the ninth aspect.

In a tenth aspect of the invention, of the solid-state imaging apparatus according to the eighth aspect, when the second mode is set, the scanning control section controls the electronic shutter scanning circuit to cause the second line select signal to be outputted simultaneously to one line of the first lines and to at least one line of the omitted lines.

The first and second embodiments correspond to an embodiment of the solid-state imaging apparatus according to the tenth aspect.

In an eleventh aspect of the invention, the electronic shutter scanning circuit in the solid-state imaging apparatus according to the ninth aspect includes a simultaneous setting section for setting the start signal simultaneously to the unit corresponding to the start unit and to a number of the units corresponding to the number of lines of the omitted lines. When the second mode is set, the scanning control section activates function of the simultaneous setting section.

The first embodiment corresponds to an embodiment of the solid-state imaging apparatus according to the eleventh aspect.

In a twelfth aspect of the invention, of the solid-state imaging apparatus according to the ninth aspect, when the second mode is set, the scanning control section activates function of the second skip circuit section at the same time of consecutively outputting the start signal for a number of times corresponding to the number of lines of the omitted lines.

The second embodiment corresponds to an embodiment of the solid-state imaging apparatus according to the twelfth aspect.

In a thirteenth aspect of the invention, the scanning control section in the solid-state imaging apparatus according to the first aspect controls the electronic shutter scanning circuit to cause the second line select signal to be outputted simultaneously to a plurality of the omitted lines.

The first and second embodiments correspond to an embodiment of the solid-state imaging apparatus according to the thirteenth aspect.

In a fourteenth aspect of the invention, the scanning control section in the solid-state imaging apparatus according to the first aspect controls the electronic shutter scanning circuit to cause the second line select signal to be outputted simultaneously to one line of the first lines and to at least one line of the omitted lines.

The first and second embodiments correspond to an embodiment of the solid-state imaging apparatus according to the fourteenth aspect.

In a fifteenth aspect of the invention, the electronic shutter scanning circuit in the solid-state imaging apparatus according to the thirteenth aspect is composed of a plurality of units connected in cascade, each unit comprising a select signal outputting section for transmitting to a next unit a start signal inputted to a start unit corresponding to a line where scanning is to be started and for outputting it as the second line select signal, and further includes a skip circuit section for executing skipping of lines to which the second line select signal is to be outputted in accordance with the number of lines of the omitted lines, and a simultaneous setting section for setting the start signal simultaneously to the start unit and to a number of the units corresponding to the number of lines of the omitted lines. The scanning control section activates function of the skip circuit section and the simultaneous setting section at the same time of outputting the start signal.

The first embodiment corresponds to an embodiment of the solid-state imaging apparatus according to the fifteenth aspect.

In a sixteenth aspect of the invention, the electronic shutter scanning circuit in the solid-state imaging apparatus according to the thirteenth aspect is composed of a plurality of units connected in cascade, each unit comprising a select signal outputting section for transmitting to a next unit a start signal inputted to a start unit corresponding to a line where scanning is to be started and for outputting it as the second line select signal, and further includes a skip circuit section for executing skipping of lines to which the second line select signal is to be outputted in accordance with the number of lines of the omitted lines. The scanning control section activates function of the skip circuit section at the same time of consecutively outputting the start signal for a number of times corresponding to the number of lines of the omitted lines.

The second embodiment corresponds to an embodiment of the solid-state imaging apparatus according to the sixteenth aspect.

In a seventeenth aspect of the invention, the line scanning circuit in the solid-state imaging apparatus according to the first aspect is composed of a plurality of units connected in cascade, each unit comprising a first select signal outputting section for transmitting to a next unit a start signal inputted to a start unit corresponding to a line where scanning is to be started and for outputting it as the first line select signal, and further includes a first skip circuit section for executing skipping of lines to which the first line select signal is to be outputted in accordance with the number of lines of the omitted lines. The electronic shutter scanning circuit is composed of a plurality of units connected in cascade, each unit comprising a second select signal outputting section for transmitting to a next unit the start signal inputted to a start unit corresponding to a line where scanning is to be started and for outputting it as the second line select signal, and further includes a second skip circuit section for executing skipping of lines to which the second line select signal is to be outputted in accordance with the number of lines of the omitted lines. The scanning control section activates function of the first skip circuit section with setting the start signal to the start unit of the line scanning circuit, and at the same time activates function of the second skip circuit section with setting the start signal to the unit corresponding to the start unit and to a number of the units corresponding to the number of lines of the omitted lines of the electronic shutter scanning circuit.

The first and second embodiments correspond to an embodiment of the solid-state imaging apparatus according to the seventeenth aspect.

In an eighteenth aspect of the invention, the scanning control section in the solid-state imaging apparatus according to the seventeenth aspect controls the electronic shutter scanning circuit to cause the second line select signal to be outputted simultaneously to a plurality of the omitted lines.

The first and second embodiments correspond to an embodiment of the solid-state imaging apparatus according to the eighteenth aspect.

In a nineteenth aspect of the invention, the scanning control section in the solid-state imaging apparatus according to the seventeenth aspect controls the electronic shutter scanning circuit to cause the second line select signal to be outputted simultaneously to one line of the first lines and to at least one line of the omitted lines.

The first and second embodiments correspond to an embodiment of the solid-state imaging apparatus according to the nineteenth aspect.

In a twentieth aspect of the invention, the electronic shutter scanning circuit in the solid-state imaging apparatus according to the eighteenth aspect includes a simultaneous setting section for setting the start signal simultaneously to the unit corresponding to the start unit and to a number of the units corresponding to the number of lines of the omitted lines. The scanning control section activates function of the simultaneous setting section.

The first embodiment corresponds to an embodiment of the solid-state imaging apparatus according to the twentieth aspect.

In a twenty-first aspect of the invention, the scanning control section of the solid-state imaging apparatus according to the eighteenth aspect activates function of the second skip circuit section at the same time of consecutively outputting the start signal for a number of times corresponding to the number of lines of the omitted lines.

The second embodiment corresponds to an embodiment of the solid-state imaging apparatus according to the twenty-first aspect.

DESCRIPTION OF THE PREFERRED EMBODIMENTS

First Embodiment

Figure 3:
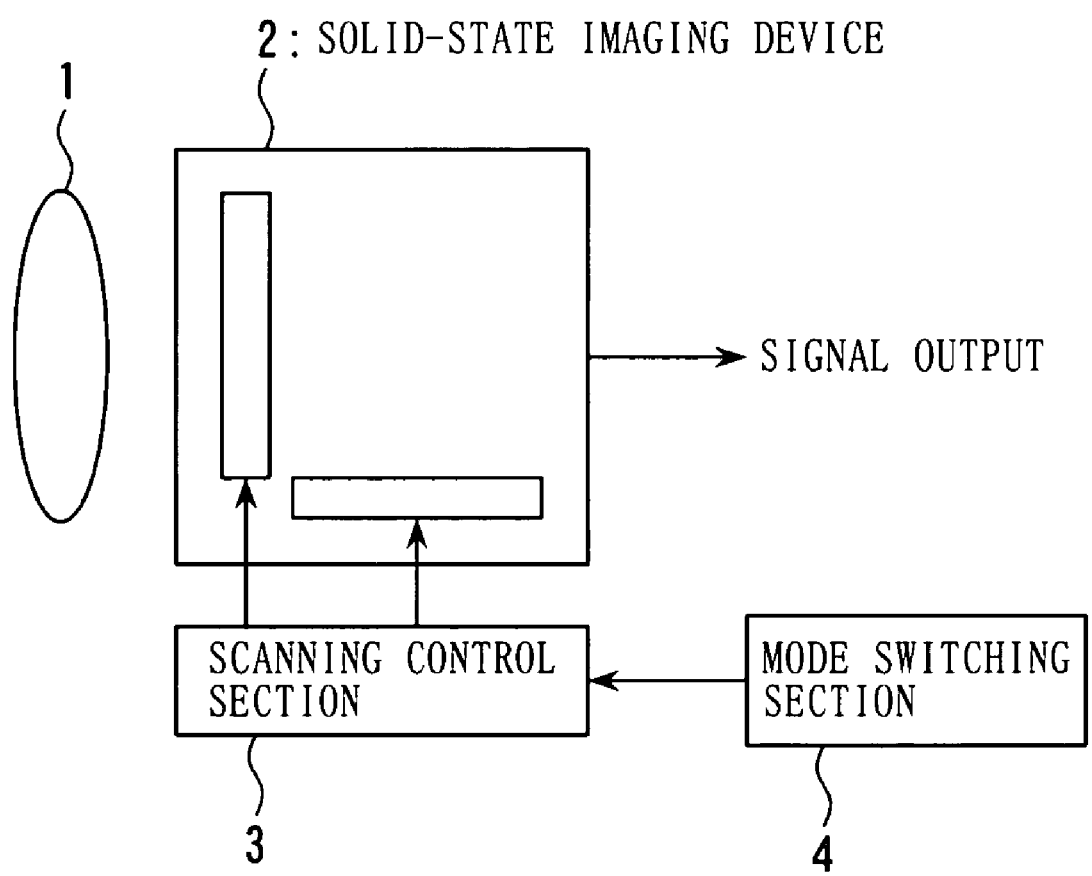
FIG. 3 is a block diagram showing fundamental construction of a first embodiment of the solid-state imaging apparatus according to the invention.

Some embodiments of the invention will be described below with reference to the drawings. A first embodiment of the solid-state imaging apparatus according to the invention will now be described. FIG. 3 is a block diagram schematically showing fundamental construction of the solid-state imaging apparatus according to the present embodiment. As shown in FIG. 3, the solid-state imaging apparatus according to this embodiment includes: a taking lens 1 constituting a part of the taking optical system for transmitting a light flux from an object to form a predetermined object image and cause it to be formed into an image on a predetermined imaging plane; a solid-state imaging device 2 having an imaging plane consisting of a plurality of pixel cells, for receiving an object image formed on the imaging plane as having been transmitted through the taking lens 1 to effect photoelectric conversion thereof and for outputting resulting electrical signals; a scanning control section 3 for controlling scanning of each scanning circuit of the solid-state imaging device 2; and a mode switching section 4 for switching between scanning modes.

Figure 1:
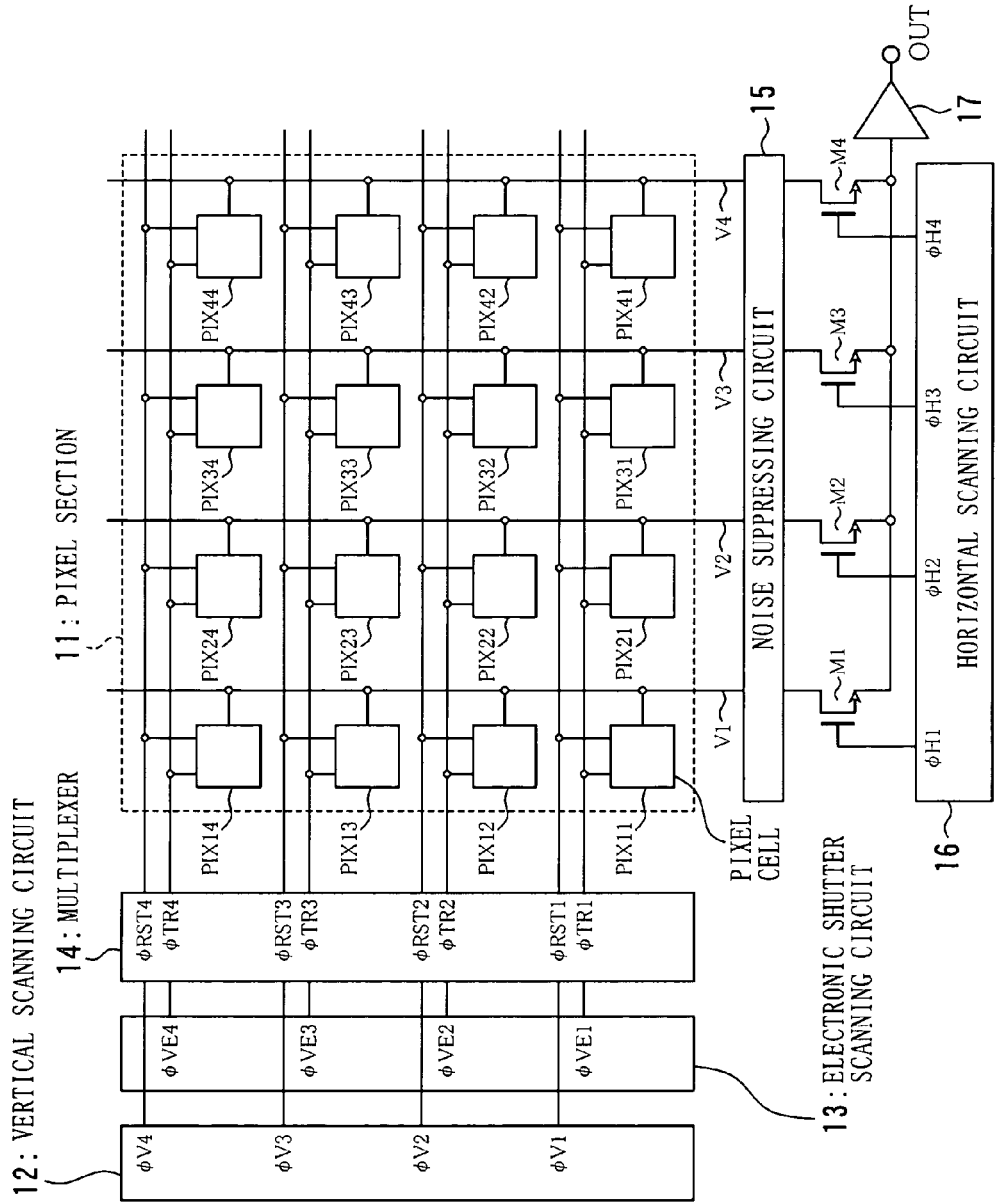
FIG. 1 is a block diagram showing an example of construction of a prior-art solid-state imaging apparatus having an electronic shutter function.
Figure 2:
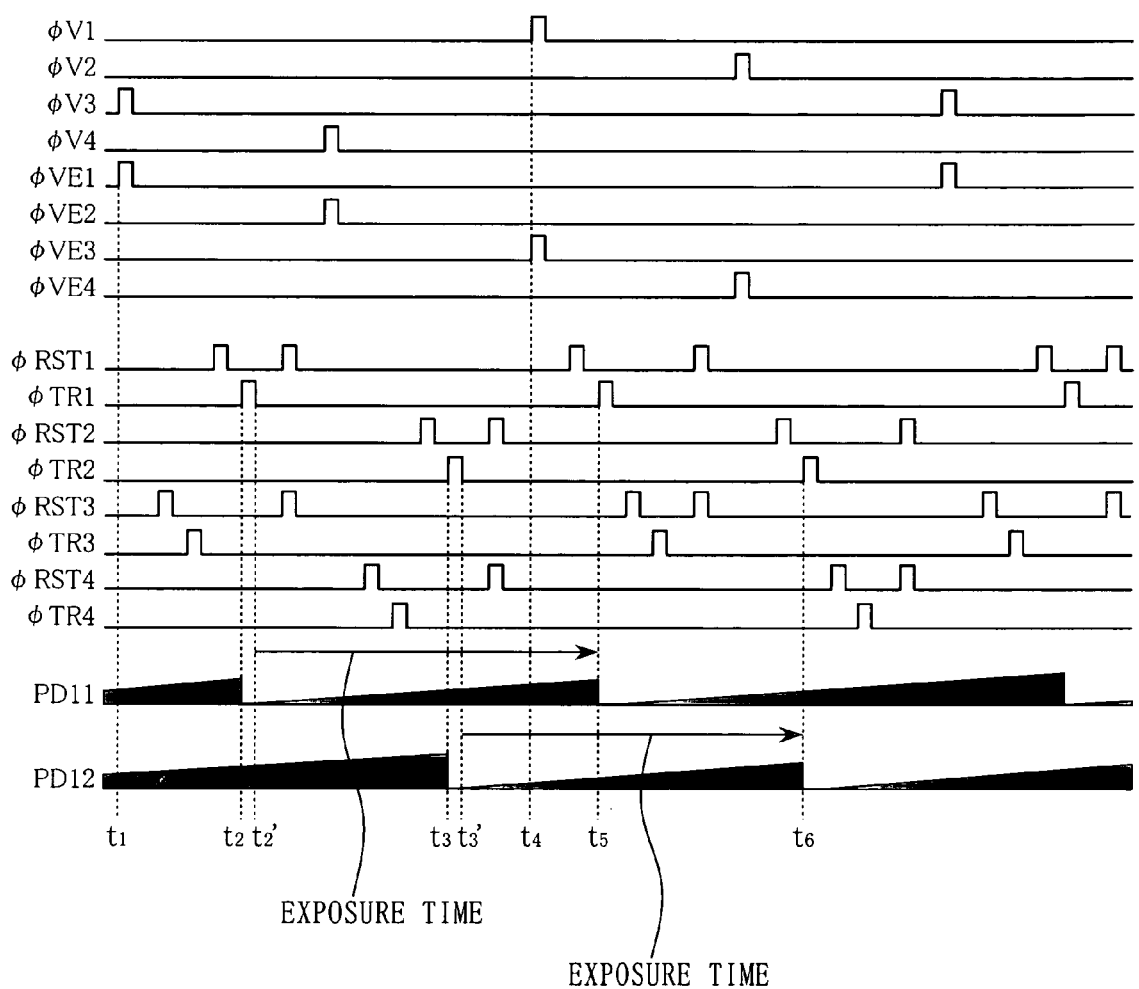
FIG. 2 is a timing chart for explaining operation in the solid-state imaging apparatus shown in FIG. 1.
Figure 4:
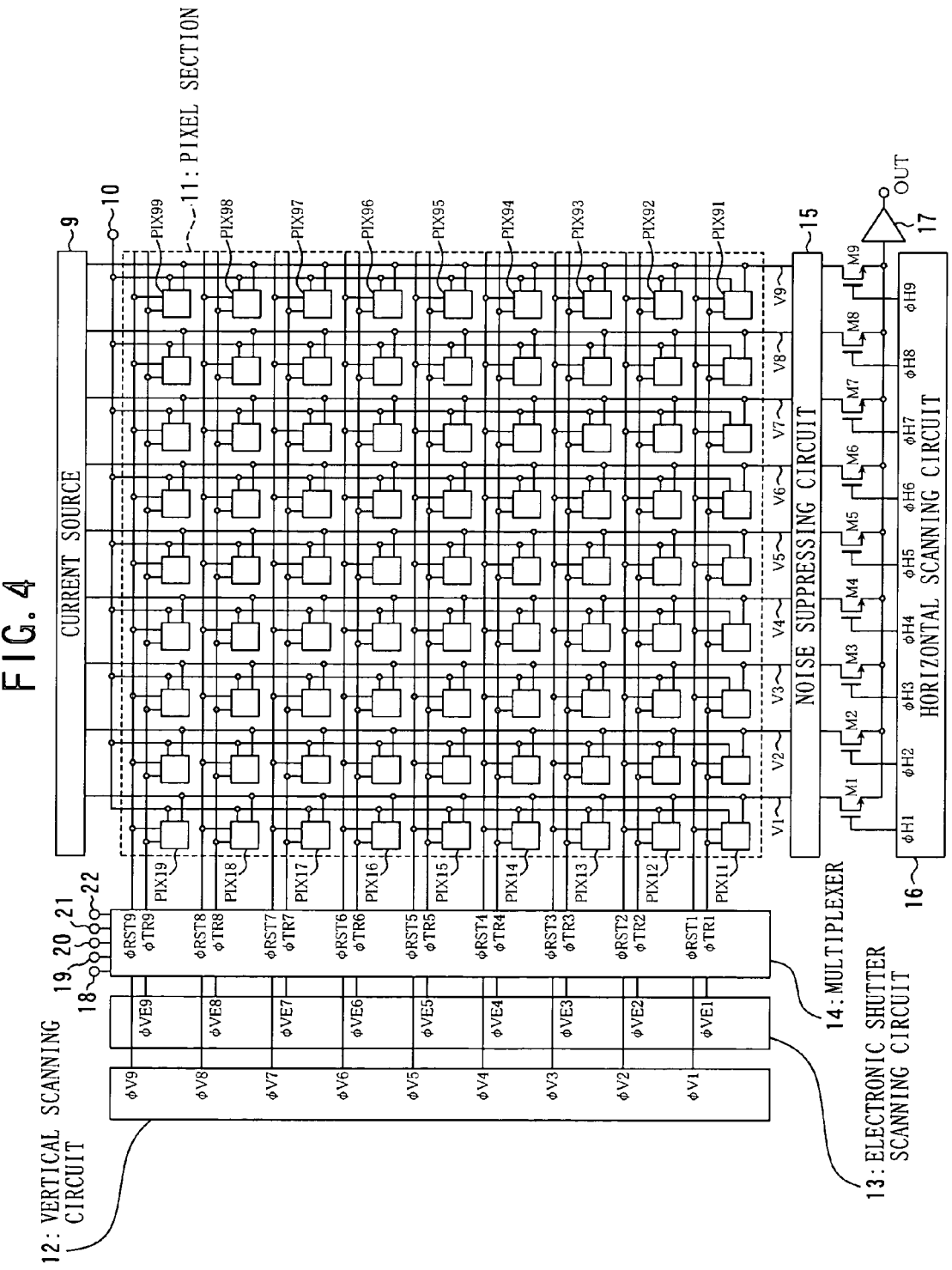
FIG. 4 is a block diagram showing construction of an imaging device of the solid-state imaging apparatus according to the first embodiment shown in FIG. 3.

FIG. 4 is a block diagram schematically showing the solid-state imaging device 2 of FIG. 3, where like or corresponding components as in the prior-art example shown in FIG. 1 are denoted by like reference numerals. This solid-state imaging device includes: a pixel section 11 having a plurality of pixel cells PIX11 to PIX99 disposed in a matrix (showing only 81 pixel cells PIX11 to PIX99 for ease of explanation); an electric current source 9 for supplying electric current to the pixel section 11; a vertical scanning circuit 12 for use in selecting rows to be read of the pixel section 11; an electronic shutter scanning circuit 13 for use in determining start of exposure; a multiplexer 14 for outputting to the pixel section 11 one or the other of the vertical scanning circuit 12 and the electronic shutter scanning circuit 13; a noise suppressing circuit 15 for suppressing noise contained in the signals read out to vertical signal lines V1 to V9 of each column; a horizontal scanning circuit 16 for extracting signals from the noise suppressing circuit 15 by selectively turning ON/OFF horizontal select switches M1 to M9; and an output amplifier 17 for amplifying the extracted signals.

Also referring to FIG. 4, numerals are used to denote: 10, power supply line for pixel cells (VDDCEL); 18, read reset pulse line (RST); 19, read transfer pulse line (TR); 20, electronic shutter reset pulse line (ERST); 21, electronic shutter transfer pulse line (ETR); 22, pulse line (VDRRS) for fetching outputs of the vertical scanning circuit 12 and the electronic shutter scanning circuit 13; read row select lines φV1 to φV9; electronic shutter row select lines φVE1 to φVE9; pixel reset pulse line φRST1 to φRST9 of each row; pixel transfer pulse line φTR1 to φTR9 of each row; vertical signal line V1 to V9 of each column; column select lines φH1 to φH9; and a sensor output line OUT.

The vertical scanning circuit 12, electronic shutter scanning circuit 13, multiplexer 14, and horizontal scanning circuit 16 are connected to the scanning control section 3 shown in FIG. 3, and are controlled by control signals generated at the scanning control section 3 in accordance with signals from the mode switching section 4 which is connected to the scanning control section 3.

Here, the scanning control section 3 has a first mode and a second mode as the modes which can be set by the mode switching section 4. The first mode is a mode for consecutively setting lines of the rows to be included in readout (the first lines) of the pixel section 11, and the second mode is a mode (skipping mode) for setting lines of the rows to be included in readout (the first lines) of the pixel section 11 with omitting a predetermined number of rows. In the following description, the second mode is set wherever an operation of skipping read is explained.

Figure 5:
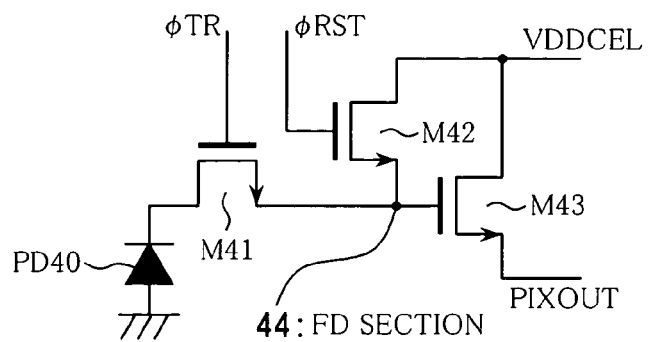
FIG. 5 is a circuit diagram showing an example of construction of pixel cell in the imaging device shown in FIG. 4.

FIG. 5 is a circuit diagram showing an example of actual construction of each pixel cell PIX11 to PIX99 in the solid-state imaging device shown in FIG. 4. This pixel cell includes: a photodiode PD40 for converting incident light into an electrical signal; a transfer transistor M41; a reset transistor M42; and a pixel amplification transistor M43. Symbols used in the figure are: φRST for the pixel reset pulse line; φTR for the pixel transfer pulse line; VDDCEL for the power supply line of pixel cell; and PIXOUT for the pixel output line. Numeral 44 denotes a floating diffusion (hereinafter referred to as FD) section.

Figure 6:
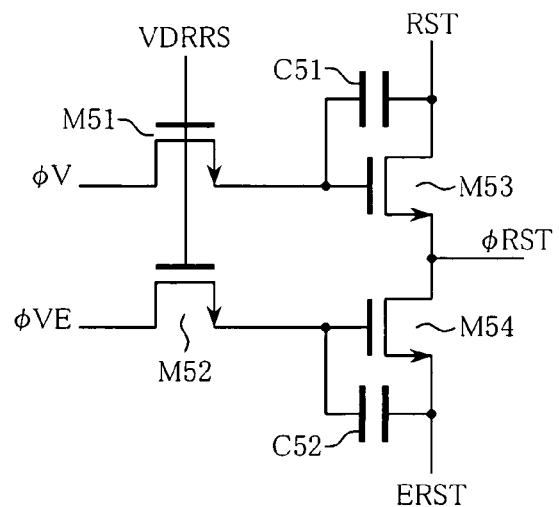
FIG. 6 is a circuit diagram showing construction of a pixel reset pulse output circuit of a multiplexer in the imaging device shown in FIG. 4.
Figure 7:
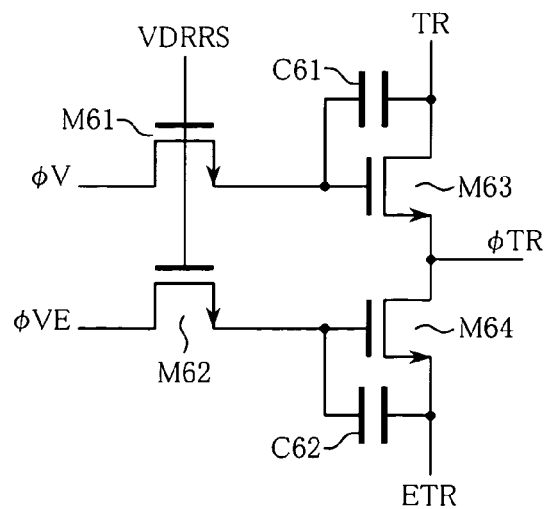
FIG. 7 is a circuit diagram showing construction of a pixel transfer pulse output circuit of the multiplexer in the imaging device shown in FIG. 4.

FIGS. 6 and 7 are circuit diagrams for showing an example of actual construction of the multiplexer 14 in the solid-state imaging apparatus shown in FIG. 4. The multiplexer 14 is formed of a pair consisting of a pixel reset pulse output circuit shown in FIG. 6 and a pixel transfer pulse output circuit shown in FIG. 7 having an identical construction. In actual construction of the multiplexer, those of such construction are provided corresponding to the number of rows in the pixel section. In FIGS. 6 and 7 are: M51, M61, output fetching transistor of the vertical scanning circuit 12; M52, M62, output fetching transistor of the electronic shutter scanning circuit 13; M53, read reset pulse output transistor; M54, electronic shutter reset pulse output transistor; M63, read transfer pulse output transistor; M64, electronic shutter transfer pulse output transistor; and capacitors C51, C52, and C61, C62. Also there are: RST for read reset pulse; ERST for electronic shutter reset pulse; TR for read transfer pulse; ETR for electronic shutter transfer pulse; VDRRS for scanning circuit output fetching pulse; φV for read row select line; φVE for electronic shutter row select line; φRST for pixel reset pulse line; and φTR for pixel transfer pulse line.

A reset operation and read operation of the pixel cell shown in FIG. 5 will be described in the following. The reset operation of the pixel cell will now be described. When the power supply line (VDDCEL) 10 of pixel cell is set to "H" level, an electric current is supplied to the pixel cell from the current source 9 to start an operation mode. When the reset transistor M42 is turned ON by the pixel reset pulse line φRST, FD section 44 is set to the same "H" level as the power supply line VDDCEL. Next, after turning OFF the reset transistor M42 by the pixel reset pulse line φRST, when the transfer transistor M41 is turned ON by the pixel transfer pulse line φTR, the electric charge accumulated at photodiode PD40 is transferred to FD section 44 through the transfer transistor M41. The electric charge at photodiode PD40 is thereby cleared to effect reset operation of the pixel cell. Subsequently, the transfer transistor M41 is turned OFF by the pixel transfer pulse line φTR so as to bring photodiode PD40 into its charge accumulating state to end reset operation of the pixel cell.

Further, after setting the power supply line VDDCEL to "L" level, when the reset transistor M42 is turned ON by the pixel reset pulse line φRST, FD section 44 is set to the same "L" level as the power supply line VDDCEL. Next, the reset transistor M42 is turned OFF by the pixel reset pulse line φRST to retain "L" level at FD section 44, thereby the pixel cell is brought into non-operation state. Light being incident in this condition is accumulated at photodiode PD40 as an electrical signal.

The read operation of the pixel cell will now be described. First the power supply line VDDCEL is set to "H" level. Next, the reset transistor M42 is turned ON by the pixel reset pulse line φRST to set FD section 44 to the same "H" level as the power supply line VDDCEL. Next, after turning OFF the reset transistor M42 by the pixel reset pulse line φRST, the transfer transistor M41 is turned ON by the pixel transfer pulse line φTR. The electric charge accumulated at photodiode PD40 is thereby transferred to FD section 44. Subsequently, the transfer transistor M41 is turned OFF by the pixel transfer pulse line φTR to end the transfer.

The electric charge at FD section 44 is outputted as voltage to the output line PIXOUT of the pixel through the pixel amplification transistor M43. Next, the power supply line VDDCEL is set to "L" level, and the reset transistor M42 is turned ON by the pixel reset pulse line φRST. FD section 44 is thereby set to the same "L" level as the power supply line VDDCEL. Subsequently, the reset transistor M42 is turned OFF by the pixel reset pulse line φRST to keep FD section 44 to "L" level. At this point, signal readout from the pixel cell is complete.

An operation will now be described of the multiplexer 14 which is formed of the pixel reset pulse output circuit and the pixel transfer pulse output circuit shown in FIG. 6 and FIG. 7. As described above, the pixel reset pulse output circuit and the pixel transfer pulse output circuit respectively shown in FIGS. 6 and 7 are of an identical construction with each other, and their operation is substantially the same. For this reason, only the operation of the pixel reset pulse output circuit shown in FIG. 6 will be described below. In the condition where the read reset pulse RST is kept to "L" level, for example when the inputted level of the read row select line φV is "H" level, "H" level signal of the read row select line φV is accumulated at capacitor C51 if the output fetching transistor M51 is turned ON by the scanning circuit output fetching pulse VDRRS. Even after the turning OFF of the output fetching transistor M51 by the scanning circuit output fetching pulse VDRRS, the signal level accumulated at capacitor C51 is retained. Here, when the read reset pulse RST is driven to "H" level, "H" level is outputted to the pixel reset pulse line φRST.

On the other hand, when the read row select line φV is "L" level, "L" level signal is accumulated at capacitor C51. In this case, since the read reset pulse output transistor M53 is OFF, the read reset pulse RST irrespective of its signal level is not outputted onto the pixel reset pulse line φRST. While the above has been an explanation concerning the read row select line φV, one concerning the electronic shutter row select line φVE is similar. In this manner, pulse is outputted onto the pixel reset pulse line φRST in accordance with the level of the read reset pulse RST or the electronic shutter reset pulse ERST only when the read row select line φV/electronic shutter row select line φVE is "H" level. Accordingly, the pixel reset pulse line φRST and the pixel transfer pulse line φTR are driven in accordance with the output of each scanning circuit and operation of the multiplexer 14, whereby the above described reset operation and read operation of pixel cell are performed.

Figure 8:
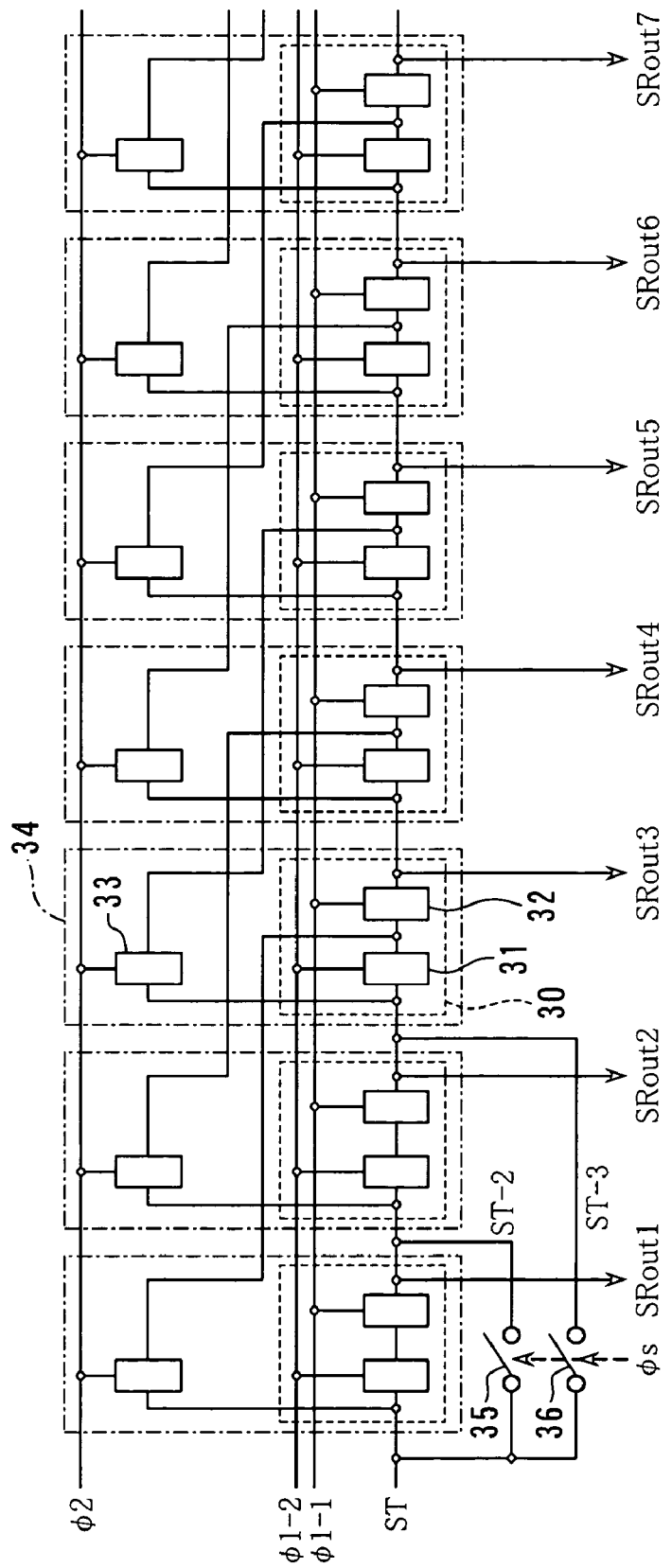
FIG. 8 is a block diagram showing an example of fundamental construction of a shift register to be used in an electronic shutter scanning circuit in the imaging device shown in FIG. 4.

FIG. 8 is a block diagram showing an example of the fundamental construction of a shift register to be used in the electronic shutter scanning circuit 13. Referring to FIG. 8, a shift register unit 34 corresponding to one stage includes: a first shift register unit 30 consisting of first subunit 31 and second subunit 32; and a second shift register unit 33. The input terminals of the first and second shift register units 30 and 33 are connected in common. Further, an output of the first shift register unit 30 is connected to an input terminal of the shift register unit of the next stage, and an output of the second shift register unit 33 is connected to an input of the second subunit 32 of the stage after the next. The first and second subunits 31, 32 of the first shift register unit 30 are driven by drive pulses φ1-2, φ1-1, respectively, and the second shift register unit 33 is driven by drive pulse φ2. An input line ST of the shift register is connected to the input terminal of the first-stage shift register unit 34, and is connected through input line ST connecting switches 35 and 36 to a second input line ST-2 to which the input terminal of the second-stage shift register unit 34 is connected, and to a third input line ST-3 to which the input terminal of the third-stage shift register unit 34 is connected. The input line ST connecting switches 35 and 36 are controlled so that they are ON when switch control pulse φs is "H" level.

It is to be noted that, in the following description, numerals in parenthesis are used so that first and second shift register units and first and second subunits of the first shift register unit are distinguished from the others as to which one of the stages in order the first and second shift register units or the first and second subunits respectively belong to. For example, "first, second shift register unit 30(1), 33(1), first, second subunit 31(1), 32(1)" will be the representation for those of the shift register unit of the first stage.

Figure 9:
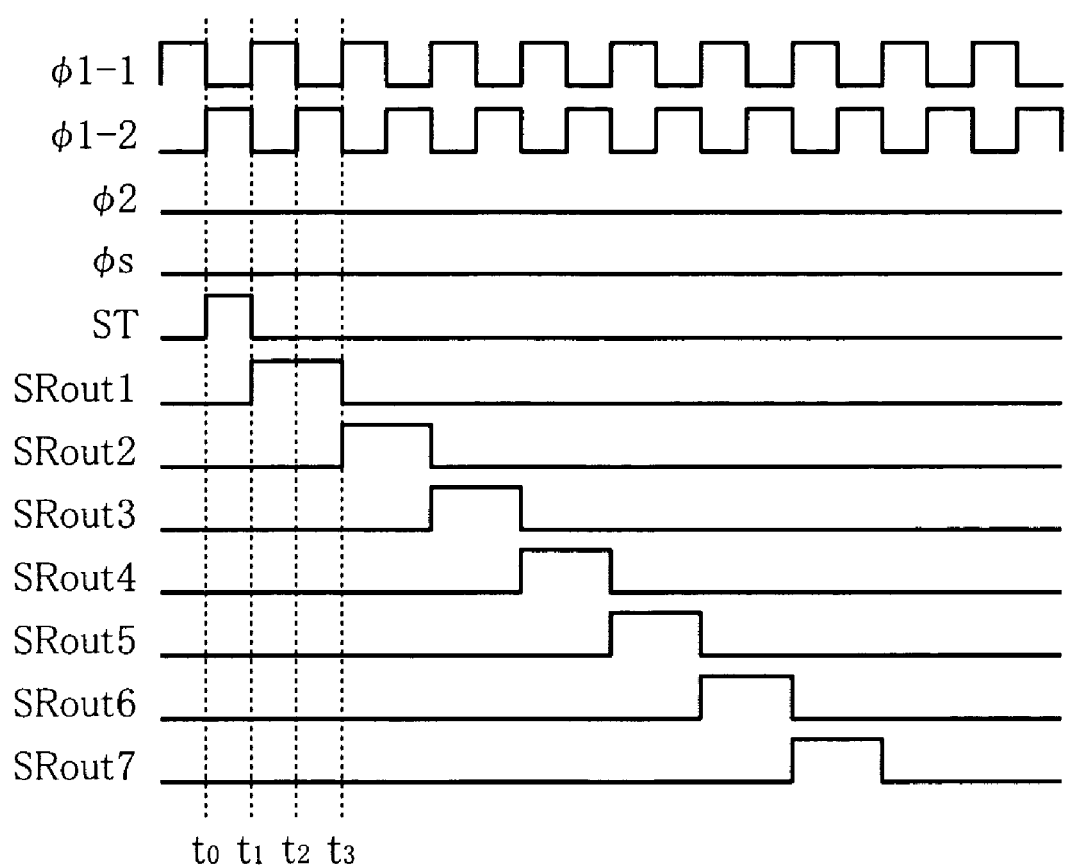
FIG. 9 is a timing chart for explaining operation in the case where the shift register shown in FIG. 8 effects sequential scanning.
Figure 10:
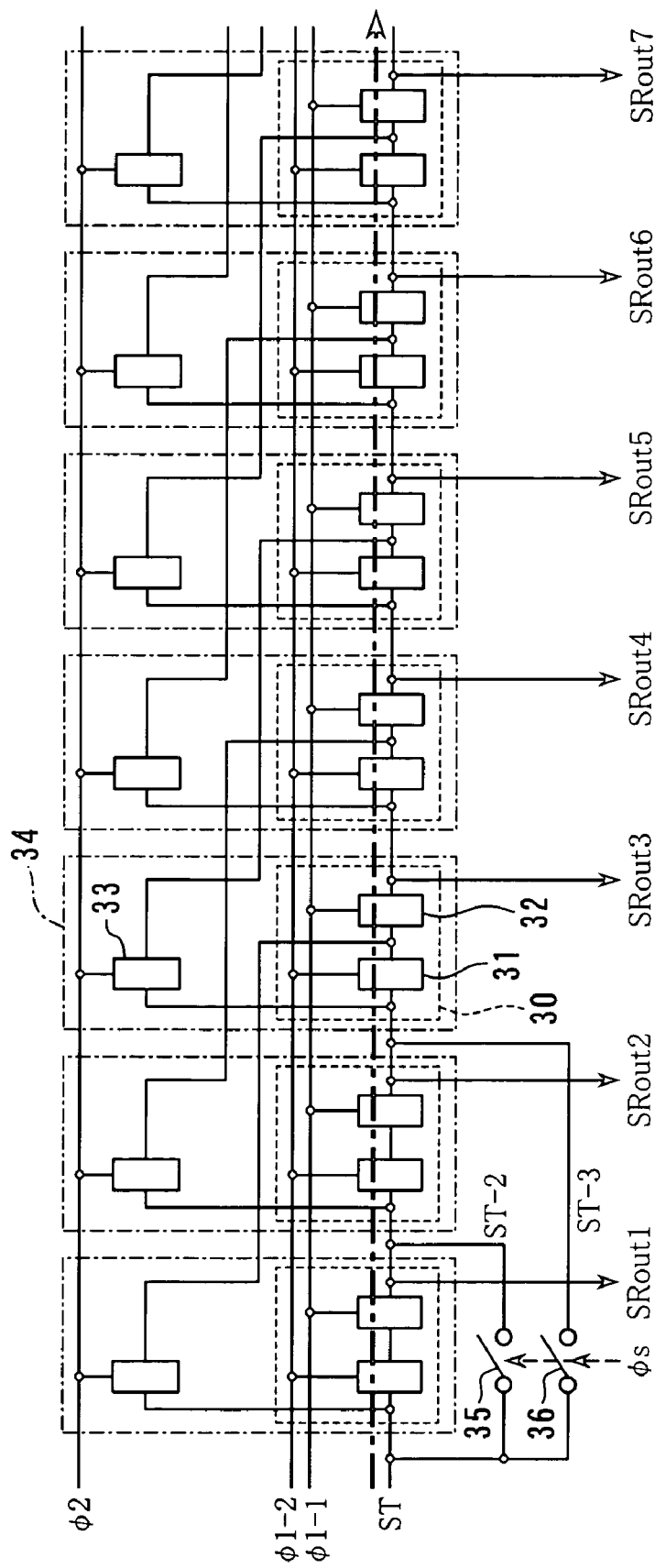
FIG. 10 shows the manner of shift of input signals in the case where sequential scanning is effected at the shift register shown in FIG. 8.

A description will now be given by way of a timing chart shown in FIG. 9 of an operation in the case where sequential scanning is effected of the shift register for use in the electronic shutter scanning circuit 13 shown in FIG. 8. Referring to the timing chart of FIG. 9, upon an application of the input signal ST to the first-stage shift register unit 34(1) at time $t_0$, when drive pulse φ1-2 is concurrently at "H" level, signal is transmitted from the first subunit 31(1) of the first shift register unit 30(1) to the second subunit 32(1). At this time, switch control pulse φs remains at "L" level. At following time $t_1$, when drive pulse φ1-1 is "H" level, signal is transmitted to the shift register unit 34(2) of the next stage by the second subunit 32(1), and at the same time output SRout1 of the first-stage shift register unit 34(1) becomes "H" level. Thereafter, signal is sequentially transmitted in a similar manner at timings where drive pulses φ1-2 and φ1-1 become "H" level. Further, during such operation, drive pulse φ2 remains "L" level, and the second shift register unit 33 does not operate. Accordingly, the input signal is shifted through within the shift register as indicated by a chain line in FIG. 10 so that it is possible to effect a sequential scanning where signal is outputted from the shift register in order of succession of SRout1, SRout2, SRout3, etc.

Figure 11:
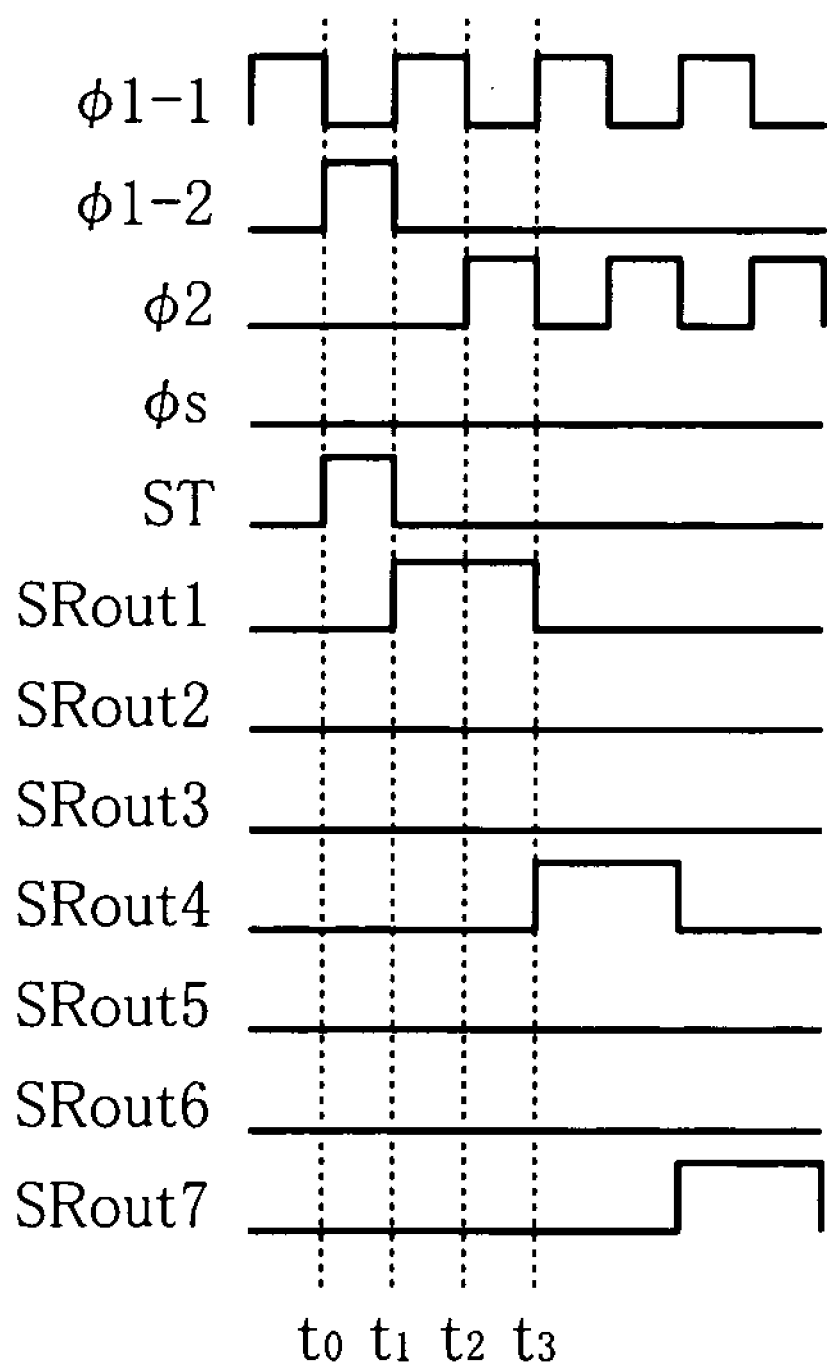
FIG. 11 is a timing chart for explaining operation in the case where the shift register shown in FIG. 8 effects skipping scanning.
Figure 12:
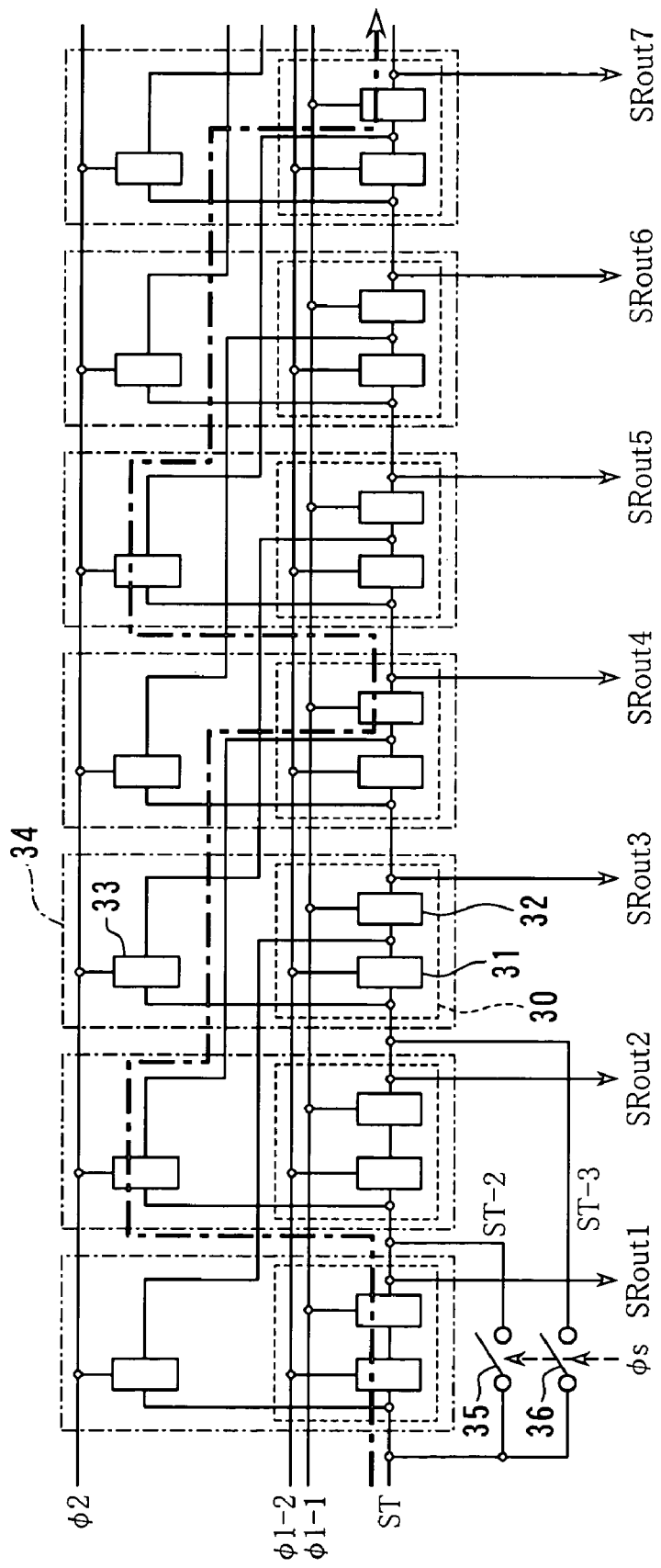
FIG. 12 shows the manner of shift of input signals in the case where skipping scanning is performed at the shift register shown in FIG. 8.

A description will now be given by way of a timing chart of FIG. 11 of an operation in the case where skipping scanning is effected of the shift register for the electronic shutter scanning circuit shown in FIG. 8. Referring to FIG. 11, upon an application of the input signal ST to the first-stage shift register unit 34(1) at time $t_0$, when drive pulse φ1-2 is concurrently at "H" level, signal is transmitted from the first subunit 31(1) of the first shift register unit 30(1) to the second subunit 32(1). At following time $t_1$, when drive pulse φ1-1 is "H" level, signal is transmitted to the shift register unit 34(2) of the next stage by the second subunit 32(1), and at the same time output SRout1 of the first-stage shift register unit 34(1) becomes "H" level. Next, when drive pulse φ2 becomes "H" level at time $t_2$, signal is transmitted to the second subunit 32(4) of the first shift register unit 30(4) of the fourth stage by the second shift register unit 33(2) of the second stage. Further, when drive pulse φ1-1 becomes "H" level at time $t_3$, signal is transmitted to the shift register unit 34(5) of the fifth stage by the second subunit 32(4) of the fourth stage, and at the same time output SRout4 of the fourth-stage shift register unit 34(4) becomes "H" level. Thereafter signal is sequentially transmitted at timings where drive pulse φ1-1 becomes "H" level. Accordingly, since the input signal ST is shifted through within the shift register as indicated by a chain line in FIG. 12, a skipping-to-1/3 scanning is effected where signal is outputted from the shift register in order of succession of SRout1, SRout4, SRout7, etc.

Figure 13:
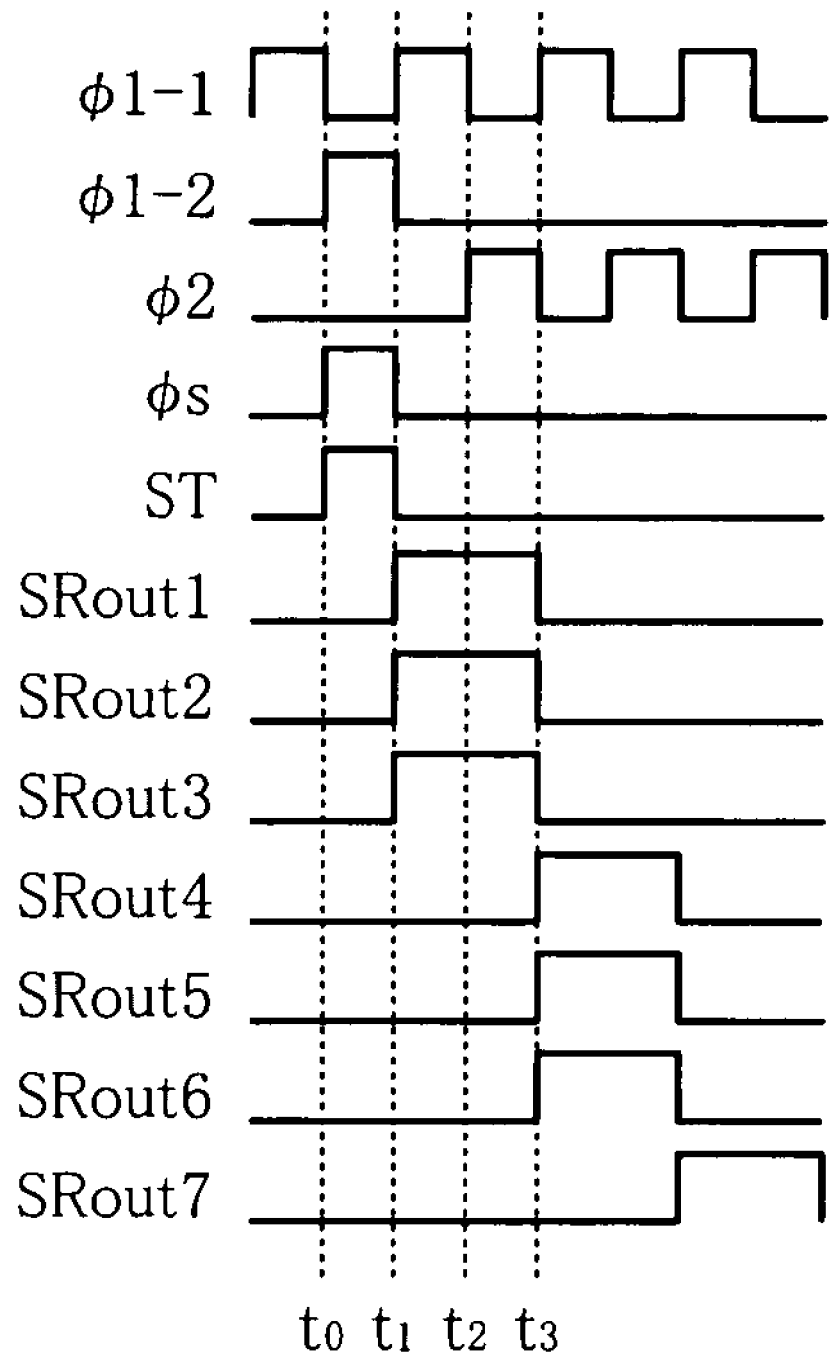
FIG. 13 is a timing chart for explaining operation in the case where three signals are simultaneously subjected to skipping scanning at the shift register shown in FIG. 8.

A description will further be given by way of a timing chart shown in FIG. 13 of an operation in the case where three signals are simultaneously subjected to skipping scanning in the shift register for electronic shutter scanning circuit shown in FIG. 8. Referring to the timing chart of FIG. 13, when switch control pulses φs becomes "H" level and at the same time input signal ST is applied at time $t_0$, the input signal ST is simultaneously applied to the first-, second-, third-stage shift register units 34(1), 34(2), 34(3) at the shift register. At the same time when drive pulses φ1-2 is "H" level, each input signal ST is transmitted from the first subunit 31(1), 31(2), 31(3) to the second subunit 32(1), 32(2), 32(3), respectively. At following time $t_1$, switch control pulse fs becomes "L" level and drive pulse φ1-1 becomes "H" level so that signals are respectively transmitted to the next stage, i.e., to the shift register units 34(2), 34(3), 34(4) of the second, third, and fourth stages by the respective second subunits 32(1), 32(2), 32(3) of the first, second, and third stages. At the same time, the respective outputs SRout1, SRout2, SRout3 of the shift register units 34(1), 34(2), 34(3) of the first to third stages simultaneously become "H" level.

Next, when drive pulse φ2 becomes "H" level at time $t_2$, signals are respectively transmitted to the second subunit 32(4), 32(5), 32(6) of the fourth to sixth stages by the second shift register unit 33(2), 33(3), 33(4) of the second to fourth stages. Further, when drive pulse φ1-1 becomes "H" at time $t_3$, signals are respectively transmitted to the shift register unit 34(5), 34(6), 34(7) of the next stage, i.e., the fifth to seventh stages by the second subunit 32(4), 32(5), 32(6) of the fourth to sixth stages. At the same time, the respective outputs SRout4, SRout5, SRout6 of the shift register unit 34(4), 34(5), 34(6) of the fourth to sixth stages becomes "H" level. Thereafter, signals are sequentially transmitted at timings where drive pulse φ1-1 becomes "H" level. Accordingly, scanning of simultaneously shifting three signals is effected such that, at first, outputs SRout1, SRout2, SRout3 of the shift register unit of the first to third stages are simultaneously outputted from the shift register, and, then, outputs SRout4, SRout5, SRout6 of the shift register unit of the fourth to sixth stages are simultaneously outputted. This corresponds to the effecting of skipping-to-1/3 scanning simultaneously for the signals that have been respectively applied to the shift register units of the first, second, and third stages.

As the above, switching between sequential scanning and skipping scanning is possible by controlling drive pulses with using a shift register having the construction as shown in FIG. 8 as the electronic shutter scanning circuit. Further, by controlling the input line ST connecting switches, it is also possible to simultaneously subject a plurality of signals to a skipping scanning.

Figure 14:
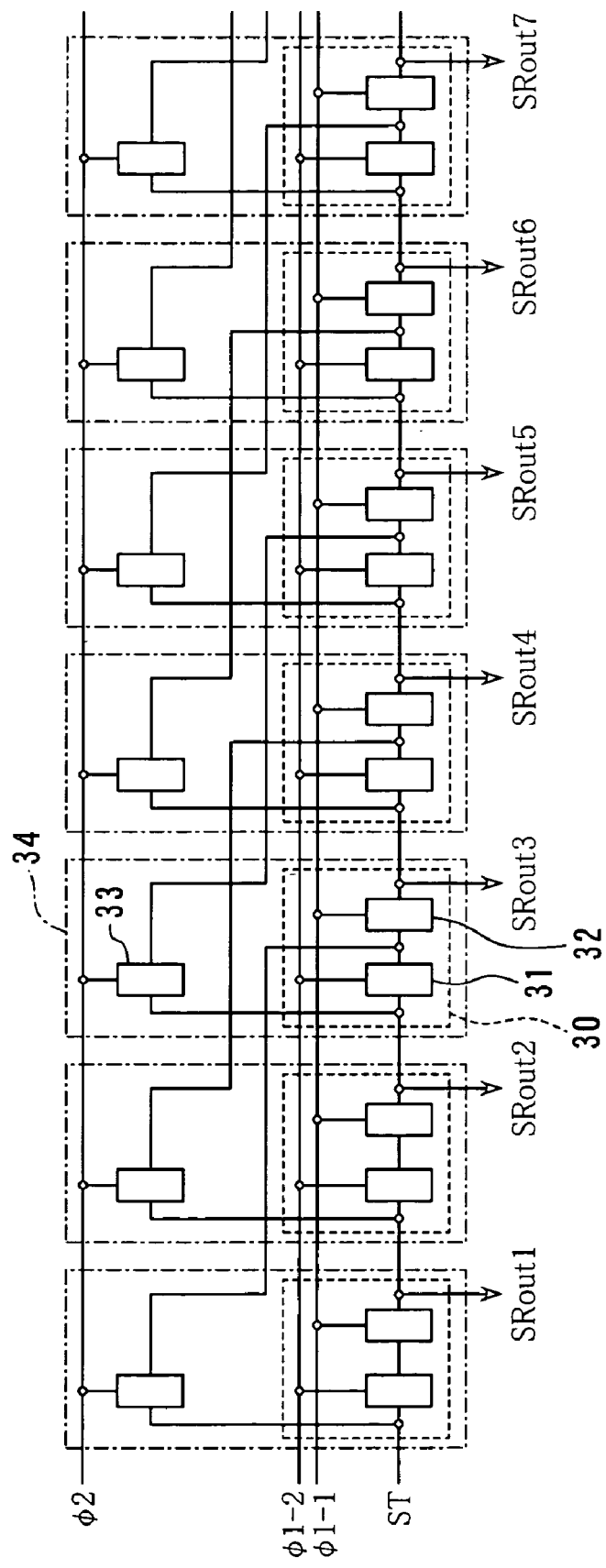
FIG. 14 is a block diagram showing an example of fundamental construction of a shift register to be used in a vertical scanning circuit in the imaging device shown in FIG. 4.

FIG. 14 is a block diagram showing an example of fundamental construction of the shift register for use in the vertical scanning circuit. The construction of this shift register for vertical scanning circuit is identical to the one for electronic shutter scanning circuit shown in FIG. 8 except that the second and third input lines ST-2, ST-3 and input line ST connecting switches 35, 36 in the shift register for electronic shutter scanning circuit shown in FIG. 8 are omitted. Further, operation where sequential scanning is effected by the shift register for vertical scanning circuit shown in FIG. 14 is identical to the operation in the case of the shift register for electronic shutter scanning circuit shown in the timing chart of FIG. 9, and operation where skipping scanning is effected is identical to the operation in the case of the shift register for electronic shutter scanning circuit shown in the timing chart of FIG. 11.

Figure 15:
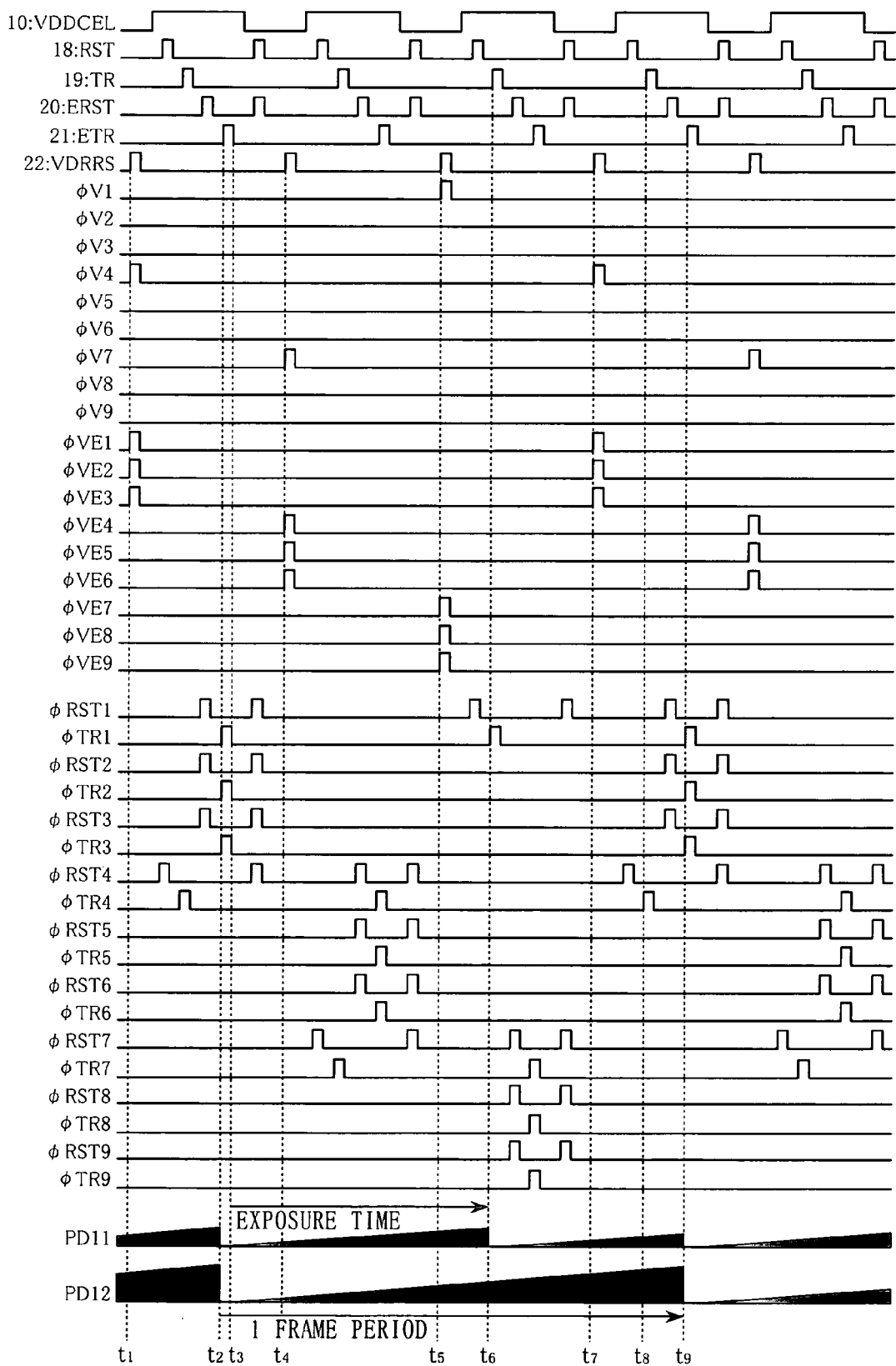
FIG. 15 is a timing chart for explaining operation in the case where skipping-to-1/3 read in rows is performed in the solid-state imaging apparatus shown in FIG. 3.

FIG. 15 is a timing chart for showing operation of the case where skipping-to-1/3 read is effected in row direction of the solid-state imaging apparatus according to the present embodiment, indicating signal waveform occurring on each signal line. In the operation example shown in FIG. 15, the pixel rows to be read out are the rows of 1, 4, and 7, and the pixels of the other rows are omitted in readout. Shown in FIG. 15 are the waveforms of: VDDCEL (power supply line 10 of pixel cell); RST (read reset pulse line 18); TR (read transfer pulse line 19); ERST (electronic shutter reset pulse line 20); ETR (electronic shutter transfer pulse line 21); VDRRS (scanning circuit output fetching pulse line 22); φV1 to φV9 (read row select line); φVE1 to φVE9 (electronic shutter row select line); φRST1 to φRST9 (pixel reset pulse line of each row); and φTR1 to φTR9 (pixel transfer pulse line of each row). Further, PD11, PD12 represent electric potentials of photodiode of the pixel cells PIX11 and PIX12, respectively, of the solid-state imaging device shown in FIG. 4.

The operation shown in the timing chart of FIG. 15 will now be described. When, at time $t_1$, the electronic shutter row select lines φVE1, φVE2, φVE3 are driven to "H" level by the electronic shutter scanning circuit 13, "H" level is retained at predetermined capacitor of the multiplexer 14 of the first to third stages in accordance with what has been described in the above. Subsequently, pixel reset pulse lines φRST1, φRST2, φRST3 corresponding to the pixel cells of the first to third rows are driven to "H" level so that FD section 44 of the pixel cells of the first to third rows is set to the same "H" level as the power supply line VDDCEL. Next at time $t_2$, when the pixel transfer pulse lines φTR1, φTR2, φTR3 corresponding to the pixel cells of the first to third rows become "H" level, electric charge accumulated at photodiode of the pixel cells of the first to third rows is transferred to FD section 44. The electric charge at photodiode of the pixel cells of the first to third rows is thereby cleared, and reset operation of these pixel cells is complete (time $t_3$). Here, at the pixel cells of the first row which is a row to be read out, time $t_3$ corresponds to the timing at which exposure is started.

Next at time $t_4$, the electronic shutter row select lines φVE4, φVE5, φVE6 corresponding to the pixel cells of the fourth to sixth rows are driven to "H" level by the electronic shutter scanning circuit 13. Subsequently, when the pixel reset pulse lines φRST4, φRST5, φRST6 become "H" level and then the pixel transfer pulse lines φTR4, φTR5, φTR6 become "H" level, the pixel cells of the fourth to sixth rows are reset. Further, at time $t_5$, the electronic shutter row select lines φVE7, φVE8, φVE9 corresponding to the pixel cells of the seventh to ninth rows are driven to "H" level by the electronic shutter scanning circuit 13. Subsequently, when the pixel reset pulse lines φRST7, φRST8, φRST9 become "H" level and then the pixel transfer pulse lines φTR7, φTR8, φTR9 become "H" level, the pixel cells of the seventh to ninth rows are reset. Also at this time, i.e., at time $t_5$, the read select line φV1 corresponding to the pixel cells of the first row is driven to "H" level by the vertical scanning circuit 12, and when, at time $t_6$, the pixel transfer pulse line φTR1 becomes "H" level in accordance with operation of the multiplexer 14, the electric charge of the pixel cells of the first row is transferred so that the pixel cells of the first row are read out.

When time $t_7$ is reached, the read select line φV4 corresponding to the pixel cells of the fourth row is driven to "H" level by the vertical scanning circuit 12, and the electronic shutter row select lines φVE1, φVE2, φVE3 corresponding to the pixel cells of the first to third rows are driven to "H" level again by the electronic shutter scanning circuit 13. Subsequently, the pixel reset pulse line φRST4 becomes "H" level, and then at time $t_8$, the pixel transfer pulse line φTR4 becomes "H" level whereby read operation of the pixel cells of the fourth row is effected. Subsequently, the pixel reset pulse lines φRST1, φRST2, φRST3 become "H" level, and next at time $t_9$, the pixel transfer pulse lines φTR1, φTR2, φTR3 become "H" level to effect reset operation of the pixel cells of the first to third rows.

In this manner, an electronic shutter operation for determining exposure time of the pixel rows to be read and reset operation of the pixel rows to be omitted in readout are simultaneously performed when skipping read is effected. Particularly, in the operation shown in the timing chart of FIG. 15: reset operation of the second and third pixel rows is effected at the time of electronic shutter operation of the first pixel row; pixel reset operation of the fifth and sixth rows is effected at the time of electronic shutter operation of the fourth pixel row; and pixel reset operation of the eighth and ninth rows is effected at the time of electronic shutter operation of the seventh pixel row. Accordingly, at the time of skipping read, since reset operation of the pixel rows to be omitted in readout is effected at every one frame period, attainment of saturation by the electric charge accumulated at photodiode of the pixels to be omitted in readout can be inhibited. It is thereby possible to prevent an occurrence of spurious signal at adjacent pixel cells.

With the above saturation inhibiting operation, a high quality image without smear, blooming or color mixture can be obtained even at the time of skipping read. The above embodiment has been described by way of an example of but is not limited to the case where skipping-to-1/3 read is effected. The present embodiment is naturally also applicable to cases where skipping read is effected in an arbitrary manner according to use.

For example, in effecting skipping-to-1/5 read where the first and fifth rows are read out, the electronic shutter operation for determining exposure time of the first pixel row to be read and reset operation of the second to fourth pixel rows to be omitted in readout are simultaneously performed, and the electronic shutter operation for determining exposure time of the fifth pixel row to be read and reset operation of the sixth to ninth pixel rows to be omitted in readout are simultaneously performed. Since reset operation of the rows to be omitted in readout is thereby effected at every one frame period, attainment of saturation of the electric charge accumulated at photodiode of the pixels to be omitted in readout can be inhibited. It is thereby possible to prevent an occurrence of spurious signal at adjacent pixel cells.

Further, in the case where a pixel row to be omitted in readout where reset operation is not performed does exist adjacent to a pixel row to be omitted in readout where reset operation is effected at every one frame period, the influence of electric charge occurring due to the fact that saturation electric charge amount is exceeded by photodiode of the pixel row to be omitted in readout without reset operation is substantially limited to an adjacent pixel row to be omitted in readout where reset operation is effected at every one frame period. Accordingly, for example in effecting a skipping to 1/5 where the second and sixth rows are read, the electronic shutter operation for determining exposure time of the second pixel row to be read and reset operation of the first and third pixel rows to be omitted in readout existing directly above and below the second pixel row to be read are simultaneously performed. Further, the electronic shutter operation for determining exposure time of the sixth pixel row to be read and reset operation of the fifth and seventh pixel rows to be omitted in readout existing directly above and below the sixth pixel row to be read are simultaneously effected. Since reset operation of the rows to be omitted in readout existing directly above and below the pixel row to be read is thereby effected in every one frame period, it becomes possible to inhibit attainment of saturation of electric charge accumulated at photodiode of the pixels to be omitted in readout existing directly above and below a pixel row to be read. Further, it is possible to prevent an adverse effect on the pixel cells disposed in the second and sixth pixel rows to be read, caused by electric charge occurring due to the fact that photodiode of the fourth, eighth, and ninth pixel rows to be omitted in readout without reset operation exceeds a saturation electric charge amount. It is thereby possible to prevent an occurrence of spurious signal.

In this manner, an adverse effect on the pixel cells disposed in the pixel rows to be read can be prevented by resetting a minimum required number of pixel rows of the pixel rows to be omitted in readout.

Second Embodiment

Figure 16:
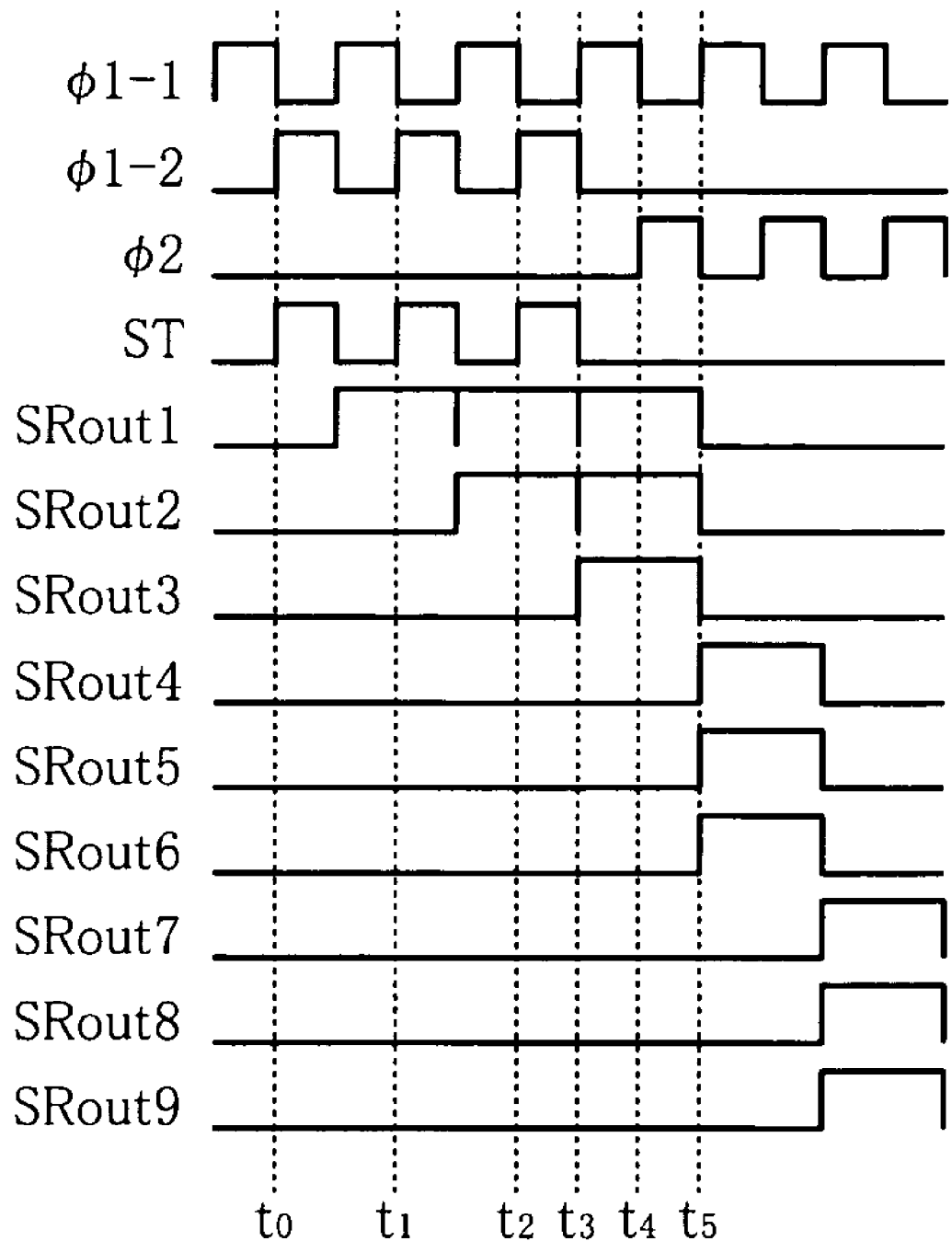
FIG. 16 is a timing chart for explaining operation in the case where skipping-to-1/3 read is performed in an electronic shutter scanning circuit of the solid-state imaging apparatus according to a second embodiment of the invention.

A second embodiment of the invention will now be described. The construction of the solid-state imaging device according to the present embodiment in itself is identical to the solid-state imaging device according to the first embodiment shown in FIG. 4. The drive method of the present embodiment however is made different from that of the electronic shutter scanning circuit 13 in the solid-state imaging device of the first embodiment shown in FIG. 4. FIG. 16 is a timing chart showing operation of the electronic shutter scanning circuit 13 in the second embodiment. In this embodiment, input signal ST is applied three time as shown in FIG. 16 at the timing of $t_0$, $t_1$, $t_2$. Thereby, at time $t_3$, outputs SRout1, SRout2, SRout3 corresponding to the pixel cells of the first to third rows of the electronic shutter scanning circuit are simultaneously driven to "H" level. From time $t_4$ on, skipping scanning is effected by drive pulses φ2 so that SRout4, SRout5, SRout6 corresponding to the pixel cells of the fourth to sixth rows become "H" level at time $t_5$.

With the above drive method, since it is not necessary to apply an input signal simultaneously to a plurality of shift register units, a shift register for vertical scanning circuit as shown in FIG. 14 without having the second and third input lines and input line connecting switches can be used in the electronic shutter scanning circuit. Accordingly, the electronic shutter scanning circuit 13 and the vertical scanning circuit 12 may be of the same construction with each other so that control terminals and wiring can be reduced to make a simpler construction possible. The above second embodiment has been described by way of an example of but is not limited to the case where skipping-to-1/3 read is effected. The present embodiment is naturally also applicable to cases where skipping read is effected in an arbitrary manner according to use.

For example, similarly to the case of the first embodiment, in effecting skipping-to-1/5 read where the first and fifth rows are read out, the electronic shutter operation for determining exposure time of the first pixel row to be read and reset operation of the second to fourth pixel rows to be omitted in readout are simultaneously performed, and the electronic shutter operation for determining exposure time of the fifth pixel row to be read and reset operation of the sixth to ninth pixel rows to be omitted in readout are simultaneously performed. Since reset operation of the rows to be omitted in readout is thereby effected at every one frame period, attainment of saturation of the electric charge accumulated at photodiode of the pixels to be omitted in readout can be inhibited. Thereby it is possible to prevent an occurrence of spurious signal at adjacent pixel cells.

Further, in the case where a pixel row to be omitted in readout where reset operation is not performed does exist adjacent to a pixel row to be omitted in readout where reset operation is effected at every one frame period, the influence of electric charge occurring due to the fact that saturation electric charge amount is exceeded by photodiode of the pixel row to be omitted in readout without reset operation is substantially limited to an adjacent pixel row to be omitted in readout where reset operation is effected at every one frame period. Accordingly, for example in effecting a skipping to 1/5 where the second and sixth rows are read, the electronic shutter operation for determining exposure time of the second pixel row to be read and reset operation of the first and third pixel rows to be omitted in readout existing directly above and below the second pixel row to be read are simultaneously performed. Further, the electronic shutter operation for determining exposure time of the sixth pixel row to be read and reset operation of the fifth and seventh pixel rows to be omitted in readout existing directly above and below the sixth pixel row to be read are simultaneously effected. Since reset operation of the rows to be omitted in readout existing directly above and below the pixel row to be read is thereby effected in every one frame period, it becomes possible to inhibit attainment of saturation of electric charge accumulated at photodiode of the pixels to be omitted in readout existing directly above and below a pixel row to be read.

Further, it is possible to prevent an adverse effect on the pixel cells disposed in the second and sixth pixel rows to be read, caused by electric charge occurring due to the fact that photodiode of the fourth, eighth, and ninth pixel rows to be omitted in readout without reset operation exceeds a saturation electric charge amount. It is thereby possible to prevent an occurrence of spurious signal.

In this manner, an adverse effect on the pixel cells disposed in the pixel rows to be read can be prevented by resetting a minimum required number of pixel rows of the pixel rows to be omitted in readout.

As has been described by way of the above embodiments, use of construction and drive method of the solid-state imaging apparatus according to the invention makes it possible to achieve a solid-state imaging apparatus capable of obtaining high-quality image signals where an occurrence of spurious signal can be inhibited so that smear and/or blooming and/or color mixture do not occur.

The advantages of the solid-state imaging apparatus according to each aspect are as follows.

With the solid-state imaging apparatus according to the first aspect, the lines to be omitted in readout are also subject of selection by the second line select signal in addition to the first lines which are subject of readout. By then effecting reset operation to the pixel cells belonging to the lines selected by the second line select signal at timings corresponding to an exposure time, the pixel cells belonging to the lines to be omitted are also reset. An electric charge saturation of the pixel cells belonging to the omitted lines is thereby inhibited so that an occurrence of spurious signal can be inhibited at the pixel cells belonging to the first lines.

With the solid-state imaging apparatus according to the second aspect, timing at which the pixel cells belonging to the omitted lines are reset is made the same as the timing at which the pixel cells belonging to the first lines are reset so that it is not necessary to secure a time period for operation that is required only for resetting the pixel cells belonging to the omitted lines. Since thereby a high-speed scanning is possible and the reset operation thereof is unified, control is also simplified.

With the solid-state imaging apparatus according to the third aspect, a mode switching section is further provided. The line scanning circuit and the electronic shutter scanning circuit are controlled by the scanning control section in accordance with a mode set by the mode switching section so that the first mode and the second mode can be set from an external section.

With the solid-state imaging apparatus according to the fourth aspect, since the second line select signal is outputted simultaneously to a plurality of the omitted lines, time periods required for operation to reset the pixel cells belonging to the plurality of the omitted lines can be put together so that a high-speed scanning is possible. Also since reset operation thereof is unified, control is simplified.

With the solid-state imaging apparatus according to the fifth aspect, since the second line select signal is outputted simultaneously to one line of the first lines and to at least one line of the omitted lines, time periods required for operation to reset the pixel cells belonging to a plurality of lines, i.e., the one line of the first lines and at least one line of the omitted lines can be put together so that a high-speed scanning is possible. Also since reset operation thereof is unified, control is simplified. It should be noted here that, in the case where there are some lines of the omitted lines which are not subject of selection by the second line select signal, even though the pixel cells belonging to such lines are not reset, the pixel cells belonging to the lines directly above and below the first lines to be read are reset so as to prevent an adverse effect on the lines to be read.

With the solid-state imaging apparatus according to the sixth aspect, start signal is set simultaneously to a start unit and to a number of units corresponding to the number of lines of the omitted lines and skip of lines corresponding to the number of lines of the omitted lines is executed so that a plurality of lines can be simultaneously selected.

With the solid-state imaging apparatus according to the seventh aspect, start signal is outputted consecutively for a number of times corresponding to the number of lines of the omitted lines and function of the skip circuit section is activated. The start signal is thereby set to the start unit and to a number of units corresponding to the number of lines of the omitted lines, and skip of lines corresponding to the number of lines of the omitted lines is executed. It is thereby possible to simultaneously select a plurality of lines.

With the solid-state imaging apparatus according to the eighth aspect, start signal is set to a start unit of the line scanning circuit and function of the first skip circuit section is activated. And at the same time, the start signal is set to a unit corresponding to the start unit and to a number of units corresponding to the number of lines of the omitted lines of the electronic shutter scanning circuit, and function of the second skip circuit section is activated. Thereby the first line select signal and the second line select signal can be outputted respectively to the line scanning circuit and the electronic shutter scanning circuit both at the same skipping interval.

With the solid-state imaging apparatus according to the ninth aspect, the second line select signal is outputted simultaneously to a plurality of lines to be omitted. Thereby the time periods required for operation to reset the pixel cells belonging to the omitted lines can be put together so that a high-speed scanning is possible. Also since reset operation thereof is unified, control is simplified.

With the solid-state imaging apparatus according to the tenth aspect, the second line select signal is outputted simultaneously to one line of the first lines and to at least one line of the omitted lines. Thereby time periods required for operation to reset the pixel cells belonging to a plurality of lines, i.e., the one line of the first lines and at least one line of the lines to be omitted can be put together so that a high-speed scanning is possible. Also since reset operation thereof is unified, control is simplified.

With the solid-state imaging apparatus according to the eleventh aspect, start signal is set to a unit corresponding to a start unit and to a number of units corresponding to the number of lines of the omitted lines, and skip of lines corresponding to the number of the omitted lines is executed. It is thereby possible to simultaneously select a plurality of lines.

With the solid-state imaging apparatus according to the twelfth aspect, start signal is outputted consecutively for a number of times corresponding to the number of lines of the omitted lines, and function of the second skip circuit section is activated. The start signal is thereby set to a unit corresponding to the start unit and to a number of units corresponding to the number of lines of the omitted lines, and skip of lines corresponding to the number of the omitted lines is executed. Accordingly, it is possible to simultaneously select a plurality of lines.

With the solid-state imaging apparatus according to the thirteenth aspect, the second line select signal is outputted simultaneously to a plurality of the lines to be omitted. Thereby the time periods required for operation to reset the pixel cells belonging to the plurality of the omitted lines can be put together so that a high-speed scanning is possible. Also since reset operation thereof is unified, control is simplified.

With the solid-state imaging apparatus according to the fourteenth aspect, the second line select signal is outputted simultaneously to one line of the first lines and to at least one line of the omitted lines. Thereby time periods required for operation to reset the pixel cells belonging to a plurality of lines, i.e., the one line of the first lines and at least one line of the lines to be omitted can be put together so that a high-speed scanning is possible. Also since reset operation thereof is unified, control is simplified.

With the solid-state imaging apparatus according to the fifteenth aspect, start signal is set simultaneously to a start unit and to a number of units corresponding to the number of lines of the omitted lines and skip of lines corresponding to the number of lines of the omitted lines is executed. Thereby a plurality of lines can be simultaneously selected.

With the solid-state imaging apparatus according to the sixteenth aspect, start signal is outputted consecutively for a number of times corresponding to the number of lines of the omitted lines and function of the skip circuit section is activated. The start signal is thereby set to the start unit and to a number of units corresponding to the number of lines of the omitted lines, and skip of lines corresponding to the number of the omitted lines is executed so that a plurality of lines can be simultaneously selected.

With the solid-state imaging apparatus according to the seventeenth aspect, start signal is set to a start unit of the line scanning circuit and function of the first skip circuit section is activated. And at the same time, the start signal is set to a unit corresponding to the start unit and to a number of units corresponding to the number of lines of the omitted lines of the electronic shutter scanning circuit, and function of the second skip circuit section is activated. Thereby the first line select signal and the second line select signal can be outputted respectively to the line scanning circuit and the electronic shutter scanning circuit both at the same skipping interval.

With the solid-state imaging apparatus according to the eighteenth aspect, the second line select signal is outputted simultaneously to a plurality of the lines to be omitted. Thereby the time periods required for operation to reset the pixel cells belonging to the plurality of the omitted lines can be put together so that a high-speed scanning is possible. Also since reset operation thereof is unified, control is simplified.

With the solid-state imaging apparatus according to the nineteenth aspect, the second line select signal is outputted simultaneously to one line of the first lines and to at least one line of the omitted lines. Thereby time periods required for operation to reset the pixel cells belonging to a plurality of lines, i.e., the one line of the first lines and at least one line of the lines to be omitted can be put together so that a high-speed scanning is possible. Also since reset operation thereof is unified, control is simplified.

With the solid-state imaging apparatus according to the twentieth aspect, start signal is set to a unit corresponding to a start unit and to a number of units corresponding to the number of lines of the omitted lines, and skip of lines corresponding to the number of the omitted lines is executed. It is thereby possible to simultaneously select a plurality of lines.

With the solid-state imaging apparatus according to the twenty-first aspect, start signal is outputted consecutively for a number of times corresponding to the number of lines of the omitted lines, and function of the second skip circuit section is activated. The start signal is thereby set to a unit corresponding to the start unit and to a number of units corresponding to the number of lines of the omitted lines and skip of lines corresponding to the number of the omitted lines is executed so that a plurality of lines can be simultaneously selected.

What is claimed is:

1. A solid-state imaging apparatus comprising:
    a pixel section having a plurality of two-dimensionally disposed pixel cells each for effecting photoelectric conversion of an incident light, accumulating the incident light as an electric charge, and converting the electric charge into an electrical signal;
    a plurality of lines each connected in common to a number of pixel cells arranged in a row direction of the pixel section;
    a line scanning circuit for outputting to said pixel section a first line select signal for selecting first lines which are a subject to be read said electrical signals;
    an electronic shutter scanning circuit for outputting to said pixel section a second line select signal for selecting second lines of a subject which an operation setting corresponding to an exposure time is effected; and
    a scanning control section for controlling selection of said first lines through said line scanning circuit, controlling, including as subject of selection said first lines and lines to be omitted in a skipping read, selection of said second lines through said electronic shutter scanning circuit, and controlling timing for resetting said pixel cells belonging to the second lines in accordance with said exposure time.

2. The solid-state imaging apparatus according to claim 1, wherein said scanning control section sets timing for resetting said pixel cells belonging to said omitted lines to the same as the timing for resetting said pixel cells belonging to said first lines, which is a timing conforming to said exposure time.

3. The solid-state imaging apparatus according to claim 1 further comprising a mode switching section for switching based on an input from an external section to set a first mode for consecutively setting said first lines or a second mode for setting said first lines while omitting a number of lines corresponding to said omitted lines, wherein said scanning control section controls said line scanning circuit and said electronic shutter scanning circuit in accordance with a mode set by said mode switching section.

4. The solid-state imaging apparatus according to claim 3, wherein, when said second mode is set, said scanning control section controls said electronic shutter scanning circuit to cause said second line select signal to be outputted simultaneously to a plurality of said omitted lines.

5. The solid-state imaging apparatus according to claim 3, wherein, when said second mode is set, said scanning control section controls said electronic shutter scanning section to cause said second line select signal to be outputted simultaneously to one line of said first lines and to at least one line of said omitted lines.

6. The solid-state imaging apparatus according to claim 4, wherein said electronic shutter scanning circuit includes a plurality of units connected in cascade, each unit comprising a select signal outputting section for transmitting to a next unit a start signal inputted to a start unit corresponding to a line where scanning is to be started and for outputting it as said second line select signal; and said electronic shutter scanning circuit further comprising:
    a skip circuit section for executing skipping of lines to which said second line select signal is to be outputted in accordance with the number of lines of said omitted lines; and
    a simultaneous setting section for setting said start signal simultaneously to said start unit and to a number of said units corresponding to the number of lines of said omitted lines;
    wherein, when said second mode is set, said scanning control section activates function of said skip circuit section and said simultaneous setting section at the same time of outputting said start signal.

7. The solid-state imaging apparatus according to claim 1, wherein said scanning control section controls said electronic shutter scanning circuit to cause said second line select signal to be outputted simultaneously to a plurality of said omitted lines.

8. The solid-state imaging apparatus according to claim 7, wherein said electronic shutter scanning circuit includes a plurality of units connected in cascade, each unit comprising a select signal outputting section for transmitting to a next unit a start signal inputted to a start unit corresponding to a line where scanning is to be started and for outputting it as said second line select signal; and said electronic shutter scanning circuit further comprising:
    a skip circuit section for executing skipping of lines to which said second line select signal is to be outputted in accordance with the number of lines of said omitted lines; and
    a simultaneous setting section for setting said start signal simultaneously to said start unit and to a number of said units corresponding to the number of lines of said omitted lines;
    wherein said scanning control section activates function of said skip circuit section and said simultaneous setting section at the same time of outputting said staff signal.

9. The solid-state imaging apparatus according to claim 1, wherein said scanning control section controls said electronic shutter scanning circuit to cause said second line select signal to be outputted simultaneously to one line of said first lines and to at least one line of said omitted lines.

10. A solid-state imaging apparatus comprising:
    a pixel section having a plurality of two-dimensionally disposed pixel cells each for effecting photoelectric conversion of an incident light, accumulating the incident light as an electric charge, and converting the electric charge into an electrical signal;
    a plurality of lines each connected in common to a number of pixel cells arranged in a row direction of the pixel section;
    a line scanning circuit for outputting to said pixel section a first line select signal for selecting first lines which are a subject to be read said electrical signals;
    an electronic shutter scanning circuit for outputting to said pixel section a second line select signal for selecting second lines of a subject which an operation setting corresponding to an exposure time is effected; and
    a scanning control section for controlling selection of said first lines through said line scanning circuit, controlling, including as subject of selection said first lines and lines to be omitted in a skipping read, selection of said second lines through said electronic shutter scanning circuit, and controlling timing for resetting said pixel cells belonging to the second lines in accordance with said exposure time;
    further comprising a mode switching section for switching based on an input from an external section to set a first mode for consecutively setting said first lines or a second mode for setting said first lines while omitting a number of lines corresponding to said omitted lines, wherein said scanning control section controls said line scanning circuit and said electronic shutter scanning circuit in accordance with a mode set by said mode switching section, wherein, when said second mode is set, said scanning control section controls said electronic shutter scanning circuit to cause said second line select signal to be outputted simultaneously to a plurality of said omitted lines; and wherein said electronic shutter scanning circuit includes a plurality of units connected in cascade, each unit comprising a select signal outputting section for transmitting to a next unit a start signal inputted to a start unit corresponding to a line where scanning is to be started and for outputting it as said second line select signal; and said electronic shutter scanning circuit further comprising:

a skip circuit section for executing skipping of lines to which said second line select signal is to be outputted in accordance with the number of lines of said omitted lines;

wherein, when said second mode is set, said scanning control section activates function of said skip circuit section at the same time of consecutively outputting said staff signal for a number of times corresponding to the number of lines of said omitted lines.

11. A solid-state imaging apparatus comprising:

a pixel section having a plurality of two-dimensionally disposed pixel cells each for effecting photoelectric conversion of an incident light, accumulating the incident light as an electric charge, and converting the electric charge into an electrical signal;

a plurality of lines each connected in common to a number of pixel cells arranged in a row direction of the pixel section;

a line scanning circuit for outputting to said pixel section a first line select signal for selecting first lines which are a subject to be read said electrical signals;

an electronic shutter scanning circuit for outputting to said pixel section a second line select signal for selecting second lines of a subject which an operation setting corresponding to an exposure time is effected; and a scanning control section for controlling selection of said first lines through said line scanning circuit, controlling, including as subject of selection said first lines and lines to be omitted in a skipping read, selection of said second lines through said electronic shutter scanning circuit, and controlling timing for resetting said pixel cells belonging to the second lines in accordance with said exposure time;

further comprising a mode switching section for switching based on an input from an external section to set a first mode for consecutively setting said first lines or a second mode for setting said first lines while omitting a number of lines corresponding to said omitted lines, wherein said scanning control section controls said line scanning circuit and said electronic shutter scanning circuit in accordance with a mode set by said mode switching section; and wherein said line scanning circuit includes a plurality of units connected in cascade, each unit comprising a first select signal outputting section for transmitting to a next unit a staff signal inputted to a staff unit corresponding to a line where scanning is to be staffed and for outputting it as said first line select signal; and said line scanning circuit further comprising:

a first skip circuit section for executing skipping of lines to which said first line select signal is to be outputted in accordance with the number of lines of said omitted lines;

wherein said electronic shutter scanning circuit includes a plurality of units connected in cascade, each unit comprising a second select signal outputting section for transmitting to a next unit said start signal inputted to a staff unit corresponding to a line where scanning is to be staffed and for outputting it as said second line select signal; and said electronic shutter scanning circuit further comprising:

a second skip circuit section for executing skipping of lines to which said second line select signal is to be outputted in accordance with the number of lines of said omitted lines; wherein, when said second mode is set, said scanning control section activates function of said first skip circuit section with setting said start signal to said start unit of said line scanning circuit, and at the same time activates function of said second skip circuit section with setting said start signal to said unit corresponding to said start unit and to a number of said units corresponding to the number of lines of said omitted lines of said electronic shutter scanning circuit.

12. The solid-state imaging apparatus according to claim 11, wherein, when said second mode is set, said scanning control section controls said electronic shutter scanning circuit to cause said second line select signal to be outputted simultaneously to a plurality of said omitted lines.

13. The solid-state imaging apparatus according to claim 12, wherein said electronic shutter scanning circuit comprises a simultaneous setting section for setting said start signal simultaneously to said unit corresponding to said start unit and to a number of said units corresponding to the number of lines of said omitted lines, and when said second mode is set, said scanning control section activates function of said simultaneous setting section.

14. The solid-state imaging apparatus according to claim 12, wherein, when said second mode is set, said scanning control section activates function of said second skip circuit section at the same time of consecutively outputting said start signal for a number of times corresponding to the number of lines of said omitted lines.

15. The solid-state imaging apparatus according to claim 11, wherein, when said second mode is set, said scanning control section controls said electronic shutter scanning circuit to cause said second line select signal to be outputted simultaneously to one line of said first lines and to at least one line of said omitted lines.

16. A solid-state imaging apparatus comprising:

a pixel section having a plurality of two-dimensionally disposed pixel cells each for effecting photoelectric conversion of an incident light, accumulating the incident light as an electric charge, and converting the electric charge into an electrical signal;

a plurality of lines each connected in common to a number of pixel cells arranged in a row direction of the pixel section;

a line scanning circuit for outputting to said pixel section a first line select signal for selecting first lines which are a subject to be read said electrical signals;

an electronic shutter scanning circuit for outputting to said pixel section a second line select signal for selecting second lines of a subject which an operation setting corresponding to an exposure time is effected; and a scanning control section for controlling selection of said first lines through said line scanning circuit, controlling, including as subject of selection said first lines and lines to be omitted in a skipping read, selection of said second lines through said electronic shutter scanning circuit, and controlling timing for resetting said pixel cells belonging to the second lines in accordance with said exposure time;

wherein said scanning control section controls said electronic shutter scanning circuit to cause said second line select signal to be outputted simultaneously to a plurality of said omitted lines, and wherein said electronic shutter scanning circuit includes a plurality of units connected in cascade, each unit comprising a select signal outputting section for transmitting to a next unit a staff signal inputted to a start unit corresponding to a line where scanning is to be started and for outputting it as said second line select signal; and said electronic shutter scanning circuit further comprising:

a skip circuit section for executing skipping of lines to which said second line select signal is to be outputted in accordance with the number of lines of said omitted lines;

wherein said scanning control section activates function of said skip circuit section at the same time of consecutively outputting said start signal for a number of times corresponding to the number of lines of said omitted lines.

17. A solid-state imaging apparatus comprising:

a pixel section having a plurality of two-dimensionally disposed pixel cells each for effecting photoelectric conversion of an incident light, accumulating the incident light as an electric charge, and converting the electric charge into an electrical signal;

a plurality of lines each connected in common to a number of pixel cells arranged in a row direction of the pixel section;

a line scanning circuit for outputting to said pixel section a first line select signal for selecting first lines which are a subject to be read said electrical signals;

an electronic shutter scanning circuit for outputting to said pixel section a second line select signal for selecting second lines of a subject which an operation setting corresponding to an exposure time is effected; and a scanning control section for controlling selection of said first lines through said line scanning circuit, controlling, including as subject of selection said first lines and lines to be omitted in a skipping read, selection of said second lines through said electronic shutter scanning circuit, and controlling timing for resetting said pixel cells belonging to the second lines in accordance with said exposure time, wherein said line scanning circuit includes a plurality of units connected in cascade, each unit comprising a first select signal outputting section for transmitting to a next unit a start signal inputted to a start unit corresponding to a line where scanning is to be started and for outputting it as said first line select signal; and said line scanning circuit further comprising:

a first skip circuit section for executing skipping of lines to which said first line select signal is to be outputted in accordance with the number of lines of said omitted lines;

wherein said electronic shutter scanning circuit includes a plurality of units connected in cascade, each unit comprising a second select signal outputting section for transmitting to a next unit said start signal inputted to a start unit corresponding to a line where scanning is to be started and for outputting it as said second line select signal; and said electronic shutter scanning circuit further comprising:

a second skip circuit section for executing skipping of lines to which said second line select signal is to be outputted in accordance with the number of lines of said omitted lines;

wherein said scanning control section activates function of said first skip circuit section with setting said start signal to said start unit of said line scanning circuit, and at the same time activates function of said second skip circuit section with setting said start signal to said unit corresponding to said start unit and to a number of said units corresponding to the number of lines of said omitted lines of said electronic shutter scanning circuit.

18. The solid-state imaging apparatus according to claim 17, wherein said scanning control section controls said electronic shutter scanning circuit to cause said second line select signal to be outputted simultaneously to a plurality of said omitted lines.

19. The solid-state imaging apparatus according to claim 18, wherein said electronic shutter scanning circuit comprises a simultaneous setting section for setting said start signal simultaneously to said unit corresponding to said start unit and to a number of said units corresponding to the number of lines of said omitted lines, and said scanning control section activates function of said simultaneous setting section.

20. The solid-state imaging apparatus according to claim 18, wherein said scanning control section activates function of said second skip circuit section at the same time of consecutively outputting said start signal for a number of times corresponding to the number of lines of said omitted lines.

21. The solid-state imaging apparatus according to claim 17, wherein said scanning control section controls said electronic shutter scanning circuit to cause said second line select signal to be outputted simultaneously to one line of said first lines and to at least one line of said omitted lines.

* * * * *